United States Patent [19]
Canestri

[11] Patent Number: 5,153,069
[45] Date of Patent: Oct. 6, 1992

[54] POLYESTERAMIDE DISPERSING AGENT

[75] Inventor: Giuseppe Canestri, Via Coghetti Nr 2, I-47037, Riminia (FO), Italy

[73] Assignee: Giuseppe Canestri, Italy

[21] Appl. No.: 664,929

[22] Filed: Mar. 5, 1991

Related U.S. Application Data

[60] Division of Ser. No. 152,800, Feb. 5, 1988, Pat. No. 4,999,132, which is a continuation of Ser. No. 818,352, Jan. 13, 1986, abandoned.

Foreign Application Priority Data

Jan. 15, 1985 [IT] Italy ............... 12001 A/85

[51] Int. Cl.$^5$ ............... B32B 3/06; C08K 5/34
[52] U.S. Cl. ............... 428/407; 524/88; 524/192
[58] Field of Search ............... 428/407; 524/88, 192

[56] References Cited

U.S. PATENT DOCUMENTS 4,863,800  9/1989  Miyoshi et al. ............... 428/407
4,885,191  12/1989  Podszum et al. ............... 428/407

FOREIGN PATENT DOCUMENTS

WO02395  9/1981  World Int. Prop. O.

Primary Examiner—Jacob Ziegler
Attorney, Agent, or Firm—Eckert Seamans Cherin & Mellott

[57] ABSTRACT

A dispersing agent for dispersing solid particles in an organic liquid having the composition $$X-\overset{O}{\underset{\|}{C}}-\overset{R_1}{\underset{|}{N}}-Y-\overset{R_2}{\underset{|}{N}}-\overset{O}{\underset{\|}{C}}-X + Z + Q$$

wherein $$X-\overset{O}{\underset{\|}{C}}-$$

is the residue of a polyester chain having a molecular weight of at least 1700, derived from a hydroxycarboxylic acid containing 16–22 carbon atoms, $$-\overset{R_1}{\underset{|}{N}}-Y-\overset{R_2}{\underset{|}{N}}-$$

is the residue of a mono or polyamide having up to 12 amido bonds, which is amino terminated in both ends and wherein $R_1$ and $R_2$ are each independently hydrogen or alkyl or alkenyl containing up to 20 carbon atoms;

Z is a salt of a carboxylic acid containing 8–18 carbon atoms and a diamine $NHR_3-T-NH_2$ wherein T is alkylene or alkenylene containing 2–12 carbon atoms and optionally comprising one or more oxygen or nitrogen bridges and $R_3$ is hydrogen or alkyl or alkenyl containing up to 20 carbon atoms;

Q is a carboxylic acid containing 8–18 carbon atoms or a diamine $NHR_3-T-NH_2$, wherein T and $R_3$ are defined as above.

Said dispersing agent can be used for preparing an easily dispersable pigment.

8 Claims, No Drawings

POLYESTERAMIDE DISPERSING AGENT

This is a division of application Ser. No. 152,800 filed Feb. 5, 1988, now U.S. Pat. No. 4,999,132, which is a continuation of application Ser. No. 818,352, filed Jan. 13, 1986, now abandoned.

This invention relates to a polymeric dispersing agent consisting of a mixture of a mainly symmetrical dipolyesteramide, a salt of a diamine and a carboxylic acid and free diamine or free carboxylic acid, which is useful for dispersing solid particles, such as pigments and dyes, in organic liquids. The invention also relates to modified dispersing agents for preparing easily dispersable phthalocyanine pigments and diazopigments respectively, comprising said dispersing agent in admixture with a pigment and an amine. An easily dispersable pigment can also be prepared from the new dispersing agent by means of specified processes.

From WO 81/02395 polymeric dispersing agents for dispersing solid particles in an organic liquid are known, consisting of an oligo or polyamide chain connected with at least one polyester chain. In preparing the dispersing agents care is taken that free carboxylic acid groups, which may be present in the polymer formed or as impurities in the reaction product, are converted into amides by means of a diamine or esterfied. Said dispersing agents are suitable for the preparation of dispersions of particles of acidic character (as defined by Palle Sörensen, Journal of Paint Technology, volume 47, No 602, March 1975, pages 31–38) for high quality litographic printing inks. The known dispersing agents, however, can not be used for several purposes. For instance, since such agents are insufficiently polar, they can not be used to prepare an easily dispersable pigment from a water slurry of the pigment.

The object of the invention is to provide a dispersing agent of greater universal application from which a water emulsion could be prepared, which can be used to disperse solid particles and especially pigments precipitated in non polar and sometimes also in polar solvents as well as during the precipitation, the pigments thus being prevented from agglomeration. Another object of the invention is to provide a dispersing agent giving low viscous dispersions of high solids loadings and having increased stability.

The objects of the invention are achieved by means of a dispersing agent having the composition

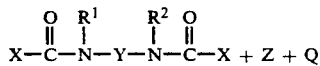    I wherein

is the residue of a polyester chain having a molecular weight of at least 1700, derived from a hydroxycarboxylic acid containing 16–22 carbon atoms,

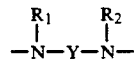

is the residue of a mono or polyamide having up to 12 amido bonds, which is amino terminated in both ends and wherein $R_1$ and $R_2$ are each independently hydrogen or alkyl or alkenyl containing up to 20 carbon atoms;

Z is a salt of a carboxylic acid containing 8–18 carbon atoms and a diamine $NHR_3-T-NH_2$ wherein T is alkylene or alkenylene containing 2–12 carbon atoms and optionally comprising one or more oxygen or nitrogen bridges and $R_3$ is hydrogen or alkyl or alkenyl containing up to 20 carbon atoms;

Q is a carboxylic acid containing 8–18 carbon atoms or a diamine $NHR_3-T-NH_2$, wherein T and $R_3$ are defined as above.

The dispersing agent of the invention consequently consists of a mixture of a major part of a mainly symmetrical polyesteramide, and a minor part of a salt and a free diamine or carboxylic acid.

The polyesteramide comprises a central mono or polyamide which is believed to come into intimate contact with the surface of the solid particle to be dispersed. To the aminoterminated ends of said amide are linked two polyester chains, which are believed to sterically prevent movements of the polyesteramide when attached to the solid particle and prevent agglomeration of the particles. It has been found that dispersants having a symmetrical structure have better dispersion properties and give a better protection against sterical movements of solid particles after dispersion in organic liquids or solids. It has also been found that the dispersants are more universally applicable when the amide part has no more than 12 amido bonds. In order to promote a greater pigment concentration while maintaining good flow properties in non polar liquids the polyester chains should have a molecular weight of at least 1700 and preferably more.

The minor part of the dispersing agent, that is the combination of a free diamine or a free carboxylic acid and a symmetrical disalt of said diamine and two molecules of said carboxylic acid, is believed to promote a quicker approach of the amide part of the polyesteramide to the surface of the pigment particle and also to promote a better emulsion of said polyesteramide in water, which is of value when the dispersing agent is to be added to a pigment in an aqueous slurry.

The relative proportion of the constituents of the dispersing agent of the invention can be described by means of percent of the total molecular weight of the dispersing agent. The molecular weight of the major polyesteramide part of the dispersant should be from 84.1 to 98.2% of the total molecular weight of the dispersing agent, a preferable range being 87 to 93%, the remaining 1.8 to 15.9%, preferably 7 to 13%, consequently being ascribed to the minor part of the dispersant. The molecular weight of the salt Z should be from 0.2 to 12% of the total molecular weight of the dispersing agent. If the proportion of the salt is too low, the dispersing properties will be negatively affected giving inferior dispersing capacity and viscosity as well as inferior pigment loading.

If, on the other hand, the proportion of the salt is too high, the properties of the final product will be deteriorated. When for instance a printing ink is prepared there will be problems, such as floating of the ink on the surface of the fountain solution. Another problem is that the lacking of azopigments can be deteriorated.

The polyester chains in the polyesteramide of the dispersing agent are preferably derived from a saturated or unsaturated aliphatic hydroxycarboxylic acid containing 18 carbon atoms or from a mixture of such hydroxycarboxylic acids and the corresponding carboxylic acids which do not contain a hydroxy group.

A useful dispersing agent comprises residues of polyester chains of the formula

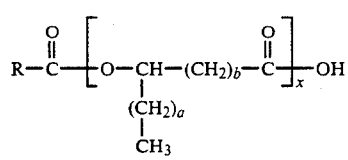  II wherein R is a saturated or unsaturated aliphatic $C_{17}$ radical, a is 4-7, b is 8-11, and x is from 8 to 68.

As examples of hydroxycarboxylic acids which can be used in preparing said polyester chains can be mentioned 11- or 12-hydroxy stearic acids, ricinoleic acid, but also compounds of the formulas $CH_3.(CH_2)_5.CH(OH)CH_2.CH=CH.(CH_2)_7.COOH$ $CH_3.(CH_2)_9.CH(OH).CH=CH.(CH_2)_4.COOH$ $HO.(CH_2)_{17}-COOH$; $(HO).CH-(CH_2)_{14}-COOH$ and $(HO).CH(CH_2)_{20}-COOH$ Commercial hydroxy acids normally also contain the corresponding carboxylic acid in an amount of 3–20% by weight and are useful starting materials in preparing the dispersants of the invention. As an example of a commercial product can be mentioned hydrogenated castor oil fatty acid mainly consisting of 12-hydroxystearic acid. Mixtures of different hydroxy carboxylic acids can also be used, such as can be derived from tall oil and tallow fatty acids.

The carboxylic acid which terminates the polyester chains of the polyesteramide can be saturated or unsaturated and contain 8 to 18 carbon atoms. This carboxylic acid can be the same as or different from the carboxylic acid forming part of the salt Z of the dispersing agent of the formula I and optionally also being present in free form as Q.

As examples of carboxylic acids can be mentioned octanoic acid, pelargonic acid, tridecanoic acid, isotridecanoic acid, stearic acid, palmitic acid, oleic acid, linoleic acid, linolenic acid and arachidic acid.

The central diamino terminated amide radical

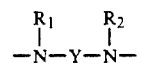

in the polyesteramide of the dispersing agent of the invention is the residue of a monoamide or a polyamide. Useful monoamides have the following formulas

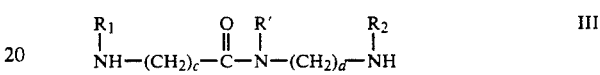  III

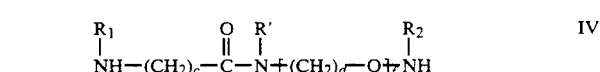  IV

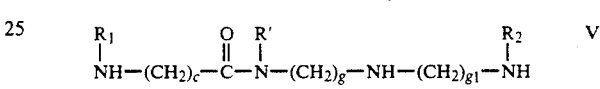  V wherein
$R_1$, $R_2$ and $R'$ are each independently hydrogen or alkyl or alkenyl containing up to 20 carbon atoms,
c is from 4 to 12,
d is from 2 to 12,
f is from 1 to 6, and
g, $g_1$, $g_2$ is from 1 to 4.

Polyamides, whereby here is intended amides having two or more amidogroups, can be of the following formulas

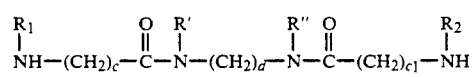

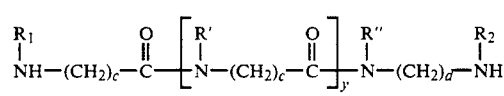

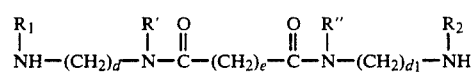

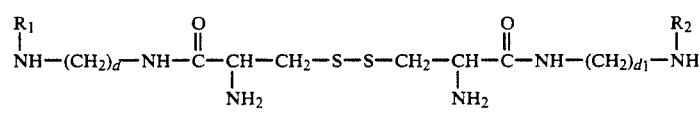

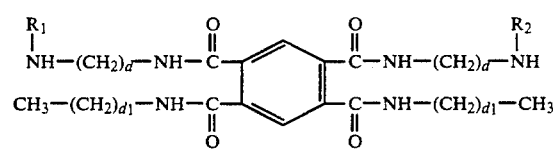

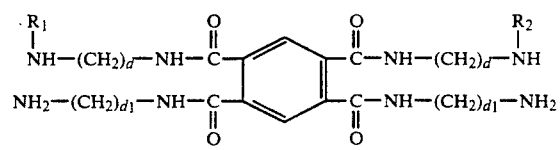

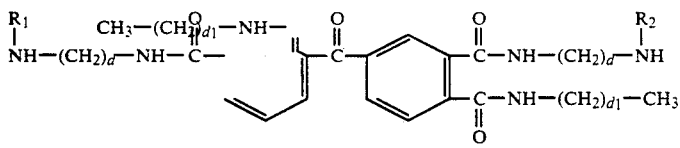

XII

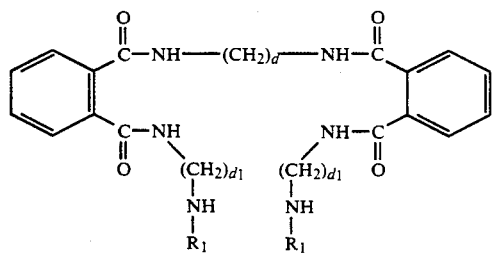

XIII

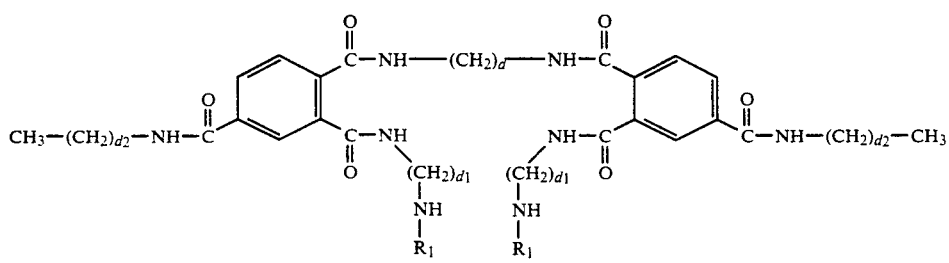

XIV wherein the carboxylic group in the 4-position of the trimellitic acid could optionally be free.

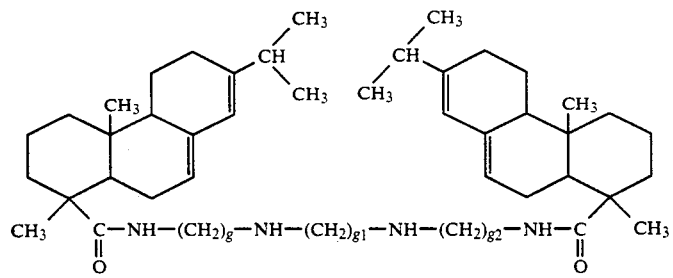

XV wherein $R_1$, $R_2$, R' and R" are each independently hydrogen or alkyl or alkenyl containing up to 20 carbon atoms, c, $c_1$ is from 4 to 12, d, $d_1$ is from 2 to 12, e is from 1 to 6, y is from 1 to 7, and g, $g_1$, $g_2$ is from 1 to 4.

The substituents $R_1$, $R_2$, R' and R" can when being alkyl radicals for example be lower alkyl containing 1–4 carbon atoms such as methyl, ethyl, n-propyl and n-butyl, or higher alkyl containing 16–20 carbon atoms derived from fatty acids obtained upon hydrolysis of lipids, as tallow or tall oil. Alkenyl radicals R are preferably derived from unsaturated fatty acids such as oleic acid and linoleic acid.

The diamine $NHR_3$—T—$NH_2$, which forms a di-salt with unreacted carboxylic acids groups, can be an alkylene diamine or an alkenylene diamine, the chain of which could optionally comprise one or more oxygen or nitrogen atoms. Useful diamines are for instance propylene diamine, tallow alkyl propylene diamine, diaminobutane, hexanediamine, diaminodecane, neopentanediamine, alkyl oleyl diamine, 3-aminopropylmethylamine, 4,7-dioxadecane-1,10-diamine, and trioxatridecane-1,13-diamine.

The dispersing agent of the invention can be prepared in several steps. First the aminoterminated mono or polyamide is prepared by reacting aminoacids with diamines, dicarboxylic acids with diamines, dicarboxylic acid anhydrides with diamines, or rosin acids with triamines.

The reactants are mixed in an organic solvent in an inert atmosphere and azeotropical conditions are maintained. The organic solvent should be an aromatic azeotropical liquid, e.g. toluene, xylene, capable of removing water, but not necessarily solubilizing the reactants. The mixture is then heated to a temperature at which the esterification takes place, that is to 50°–260°, and the esterification is allowed to proceed.

In order to prepare the polyesteramide, hydroxy carboxylic acid can then be added to the amino terminated amide product as obtained in a prescribed amount to give the desired polyester chain length at the esterification temperature. It is also possible to prepare a complete polyester chain separately, which is then linked to the amide molecule by heating the mixture to the esterification temperature.

If a commercial hydroxy carboxylic acid has been used as a reactant, the non hydroxy carboxylic acids contained therein as impurities will terminate the polyester chains. If not, it will be necessary to add a carboxylic acid for this purpose, as well as for salt forming.

When the polyesteramide part of the dispersing agent has been obtained, the temperature of the mixture is lowered and a diamine is added below 130° C. in order to form a salt with the free carboxylic acid groups in the mixture.

The product obtained, the dispersing agent of the invention, is a medium to high viscous amber coloured liquid, which can be dissolved in most non polar solvents.

The dispersing agent of the invention can be used for dispersing dry pigments or pigments in the form of a press cake in an organic liquid. It can also be used for preparing easily dispersable pigments from water slurries and in flushing operations for the production of concentrated pastes. The dispersing agent can also be used for chipping with resins or thermoplastic materials.

Lithographical printing inks will get excellent properties when prepared with the dispersing agent of the invention, basically due to the dewatering characteristics of the agent. Toluene based rotogravure inks and polyamide based flexo inks are other examples of applications which will benefit from the advantages of the present dispersants, giving for instance lower viscosity, better gloss and higher colouring strength.

A dispersion of solid particles in an organic liquid containing a dispersing agent of the invention can be prepared by well known methods for the preparation of dispersions.

Thus the solid particles, e.g. pigment particles, the organic liquid and the dispersing agent, according to the invention, may be mixed in any sequence and the mixture may then be subjected to a mechanical treatment to break down agglomerates, if any, of solid particles, e.g. by ball-milling or roller-milling.

The solid substance may also be milled alone with the dispersant or in admixture with the organic liquid and the other component(s) may be added, whereafter the dispersion is formed by stirring of the mixture.

The amount of dispersing agent in dispersions according to the invention is preferably from 1 to 40% by weight and more preferably from 5 to 38% by weight based on the weight of the solid particles. A dispersion preferably contains from 40 to 75% by weight of solid organic particles, and from 50 to 85% by weight of solid inorganic particles, based on the total weight of the dispersion.

The organic liquids used for the preparation of said dispersions may be inert organic liquids in which the dispersing agent is at least partially soluble at ambient temperature and which are stable under the conditions at which the dispersions are to be used. If desired, mixtures of organic liquids may be used. Preferred organic liquids are hydrocarbons and halogenated hydrocarbons, such as toluene, xylene, white spirit, chlorobenzene, carbontetrachloride and perchloroethylene. Also other organic liquids can be used, for example esters, such as butyl acetate, alcohols, such as n-butanol, and vegetable oils. It is particularly preferred to use petroleum fractions. In general the selection of the organic liquids or mixtures thereof used for the preparation of the dispersions will depend on the uses of the product to which the dispersions are to be added.

As mentioned above the preferable solid particles are pigment particles. In case of inorganic pigments, these are preferably the ones which contain a metal atom, and as examples of such pigments there may be mentioned titanium dioxide, prussian blue, cadmium sulphide, iron oxides, vermillon, ultramarine and chrome pigments including chromates of lead, zinc, barium and calcium and mixtures and modifications thereof. Such pigments are commercially available as greenish-yellow to red pigments under the names: primrose, lemon, middle, orange, scarlet and red chromes. The organic pigments are water insoluble metal salts or complexes, particularly Ba, Ca, Mn salts or complexes, soluble or sparingly soluble organic dyes, especially mono, di-azo, tetrazo, mixtures of tetrazo, sulphonated tetrazo, and phthalocyanines containing sulphonic groups.

Other examples of suitable pigments are described in the third edition of Colour Index (C.I. 1975, published by the American Association of Textile Chemists and Colourists and the Society of Dyers and Colourists).

Easily dispersible pigments can be prepared by adding the dispersant as an aqueous emulsion or alone, to a slurry containing the components of the pigment before coupling, to a coupled pigment before lacking, to a coupled pigment before boiling or to a coupled pigment before washing and drying.

The dispersant, in an amount of from 2 to 25%, can be added alone or together with other substances that may have a synergical action together with the dispersant, or simply a completing function not obligatory connected with dispersion promotion.

Easily dispersable pigments having better rheological and lithographical properties can be produced by means of a modified dispersing agent comprising an aminosulphonated salt of a pigment in addition to a dispersing agent of the invention.

The invention also relates to a modified dispersing agent for preparing an easily disperable phthalocyanine pigment as well as a modified dispersing agent for preparing an easily dispersable diazopigment.

The modified dispersing agent for preparing an easily dispersable phthalocyanine pigment comprises a dispersing agent of the invention in admixture with a sulphonated Cu phthalocyanine blue and an amine. A preferred composition of said modified dispersing agent is 12–16 parts by weight of a dispersing agent of the invention, 5–10 parts by weight of monosulphonated copper phthalocyanine blue and 2–6 parts by weight of a diamine $NHR_3—T—NH_2$, wherein $R_3$ is hydrogen or alkyl or alkenyl containing up to 20 carbon atoms, and T is alkylene or alkenylene containing 2–12 carbon atoms and optionally comprising one or more oxygen or nitrogen bridges. Said preferred modified dispersing agent can be used to disperse 68–81 parts by weight of a phthalocyanine pigment.

The modified dispersing agent for preparing an easily dispersable diazopigment comprises in addition to the dispersing agent of the invention, an amine and a sulphonated diazodyestuff. A preferred composition of said modified dispersing agent is 10–16 parts by weight of a dispersing agent of the invention, 5–10 parts by weight of a disulphonated diazodyestuff and 2–7 parts by weight of a diamine $NHR_3—T—NH_2$ wherein $R_3$ and T are defined as above. Said preferred modified dispersing agent can be added to 67–83 parts by weight of a diazopigment.

The invention also relates to a process for preparing an easily dispersable pigment, wherein a dispersing agent of the invention is heated under reflux together with a pigment in an organic solvent mainly of non polar nature for a period of time being sufficient for the dispersant particles to divide and adhere to the surface of the pigment, whereupon the pigment is obtained by evaporation of the solvent. When a dispersant described in the invention (or a modification thereof) is boiled together with such an organic solvent or mixtures of organic solvents the following physical modifications are obtained.

The organic solvents have the tendency to remove from the surface of the pigments organic impurities, giving the opportunity to the dispersants to approach the surface of the pigment intimately;

during the boiling, the molecules of the dispersants are able to divide finely the pigment particles, establishing on their surface a uniform coating which will be useful to promote final dispersions when concentrates should be achieved in organic vehicles.

The invention further relates to a process for preparing an easily dispersable pigment, wherein a dispersing agent of the invention is milled together with a pigment for a period of time being sufficient for the dispersant particles to divide and adhere to the surface of the pigment.

When any pigment is milled together as a dry matter in a solid/solid mixture or in a liquid/solid mixture together with a dispersant or modification thereof the particles of the pigments are finely divided and covered with a thin layer of the dispersants. This process makes the pigment particles much better dispersible in organic vehicles.

The dispersant of the invention can also be used to improve the lithographical properties of several pigments based on normal Pigment Yellow 12, Pigment Yellow 13, Pigment Yellow 14, Pigment Yellow 17, Pigment Yellow 81, Pigment Orange 13, Pigment Orange 34, Pigment Red 37, Pigment Red 41, Pigment Blue 25 and Yellow C.I. No. 21135, which contain sulphonated water soluble azo dyestuffs and amines, substituting part of the amines with the dispersants, maintaining an excess of dispersant. The same can be done with Cu phthalocyanine blue.

Pigment concentrates comprising an easily dispersable agent of the invention and an organic or inorganic pigment in an organic vehicle are useful for preparation of printing inks and paints or for colouring thermoplastic materials. On a solid basis a pigment concentrate normally contains 1-25% of the dispersing agent and 75-99% of a pigment; the organic vehicle generally represents up to 50% of the complete concentrate. The organic vehicle could be a solid or liquid substance.

The invention will be described in further details by the following examples.

EXAMPLE I

Under nitrogen atmosphere, a mixture of 200 g toluene, 402.62 g 11-amino-undecanoic acid and 396 g alkylpropylene diamine ("Duomeen T", a tallow alkyl propylene diamine from Akzo, Holland) is heated while stirring in a 10 liters glass flask at 150° C.-170° C. until 36 g water are removed azeotropically. The intermediate thus obtained is a polyamide being amino terminated in both ends and having a NH value corresponding to 2.2 equivalents $NH_2$/mole.

At 170° C., 748 g commercial 12-hydroxystearic acid (having an acid value of 180 mg KOH/g and a hydroxyl value of 150 mg KOH/g are introduced and heated while stirring at 175°-180° C. until at least 2 equivalents water are removed azeotropically. The intermediate product shows at least a hydroxyl value corresponding to 1.4-1.5 equivalents OH/mole of the intermediate.

At 180° C. 5800 g commercial 12-hydroxystearic acid (acid value 180, OH value 150) are introduced and heated while stirring at 210°-220° C., until the total amount of the water separated azeotropically is corresponding to 21.7 equivalents and the acid value of the polyesteramide product thus obtained is corresponding to 1.31 COOH equivalents/mole of the product. The toluene is removed by distillation under vacuum at 220° C., then the temperature is lowered to 130°. At 130° C., 163 g alkylpropylene diamine are introduced. The temperature is lowered to 110° C. and maintained for 1 h. A dispersant of the formula I is obtained, wherein the molecular weight of Z+Q is 7%. The polyester chains in the polyesteramide have the formula II, wherein x=8.8.

EXAMPLE 2

Under nitrogen atmosphere, a mixture of 200 g toluene, 402.62 g 11-aminoundecanoic acid and 396 g alkylpropylene diamine (Duomeen T), is heated while stirring in a 10 liters glass flask at 150° C.-170° C. until 36 g water are removed azeotropically.

The intermediate thus obtained is a polyamide being amino terminated in both ends and having a NH value corresponding to 2.2 equivalents $NH_2$/mole.

At 170° C., 680 g octadecanoic-12-hydroxy-carboxylic acid (acid value 182 mg KOH/g, hydroxyl value 160 mg KOH/g) are introduced and heated while stirring at 175°-180° C. until at least 2 equivalents water are removed azeotropically. The intermediate product shows at least a hydroxyl value corresponding to 1.9 equivalents OH/mole of the intermediate.

At 180° C. 6,500 g commercial 12-hydroxystearic acid (acid value 180, OH value 150) are introduced and heated while stirring at 210°-220° C. until the total amount of the water separated azeotropically is corresponding to 24.7 equivalents and the acid value of the polyesteramide product thus obtained is corresponding to 0.6 equivalents COOH/mole of the product. The toluene is removed by distillation under vacuum at 220° C., then the temperature is lowered to 130° C. At 130° C., 80 g alkylpropylene diamine (Duomeen T) are introduced. The temperature is lowered to 110° C. and maintained for 1 h, giving a dispersant of composition I, wherein the molecular weight of Z+Q is 3.5%. The polyester chains in the polyesteramide have the formula II, wherein x=10.

EXAMPLE 3

Under nitrogen atmosphere, a mixture of 200 g toluene, 402.62 g 11-aminoundecanoic acid and 396 g alkylpropylene diamine (Duomeen T), is heated while stirring in a 20 liters glass flask at 150°-170° C. until 36 g water are removed azeotropically. The intermediate thus obtained is a polyamide being amino terminated in both ends and having a NH value corresponding to 2.2 equivalents $NH_2$/mole.

At 170° C., 747.6 g commercial hydroxystearic acid (acid value 180 mg KOH/g, hydroxyl value 153 mg KOH/g) and 3.4 g of a mixture of 12-hydroxystearic acid and hydrogenated castor oil (acid value 4 mg KOH/g, hydroxyl value 155 mg KOH/g), are introduced and heated while stirring at 175°-180° C. until at least 2 equivalents water are removed azeotropically. The intermediate product shows at least a hydroxyl value corresponding to 1.8–1.9 equivalents OH/mole of the intermediate.

At 180° C., 10000 g commercial 12-hydroxystearic acid (acid value 180 mg KOH/g, hydroxyl value 153 mg KOH/g) and 200 g of a mixture of 12-hydroxystearic acid and hydrogenated castor oil (acid value 4 mg KOH/g, hydroxyl value 155 mg KOH/g) are introduced and heated while stirring at 210°–220° C., until the total amount of the water separated azeotropically is corresponding to 33.5 equivalents and the acid value of the polyester amide product thus obtained is corresponding to 2.9 COOH equivalents/mole of the product.

The toluene is removed by distillation under vacuum at 220° C., then the temperature is lowered to 130° C. At 130° C., 350 g alkylpropylene diamine (Duomeen T) are introduced. The temperature is lowered to 110° C. and maintained for 1 h giving a dispersant of composition I, wherein the molecular weight of Z+Q is 11%. The polyester chains in the polyesteramide have the formula II wherein $x=10$.

EXAMPLE 4

Under nitrogen atmosphere, a mixture of 500 g toluene, 402.62 g 11-aminoundecanoic acid and 396 g alkylpropylene diamine, is heated while stirring in a 20 liters glass flask at 150°–170° C. until 36 g water are removed azeotropically. The intermediate thus obtained is a polyamide being amino terminated in both ends and having a NH value corresponding to 2.2 equivalents $NH_2$/mole.

At 170° C., 748 g commercial 12-hydroxystearic acid (acid value 180 mg KOH/g, hydroxyl value 150 mg KOH/g are introduced and heated while stirring at 175° C.–180° C. until at least 2 equivalents water are removed azeotropically. The intermediate product shows at least a hydroxyl value corresponding to 1.8–2 equivalents OH/mole of the intermediate. At 180° C., 16000 g hydroxycarboxylic acid (acid value 180 mg KOH/g, hydroxyl value 150 mg KOH/g) and 150 g of a mixture of commercial 12-hydroxystearic acid and hydrogenated castor oil (acid value 4 mg KOH/g, hydroxyl value 155 mg KOH/g) are introduced and heated while stirring at 210°–220° C., until the total amount of the water separated azeotropically is corresponding to 53.1 equivalents and the acid value of the polyesteramide product thus obtained is corresponding to 2.7 equivalents COOH/mole of the product.

The toluene is removed by distillation under vacuum at 220° C., then the temperature is lowered to 130° C. At 130° C., 360 g alkylpropylene diamine (Duomeen T) are introduced. The temperature is lowered to 100° C. and maintained for 1 h giving a dispersant of composition I, wherein the molecular weight of Z+Q is 7%. The polyester chains in the polyesteramide have the formula II wherein $x=23.2$.

EXAMPLE 5

Under nitrogen atmosphere, a mixture of 1000 g toluene, 402.62 g 11-aminoundecanoic acid and 842.40 g alkylpropylene diamine (Duomeen T), is heated while stirring in a 70 liters polymer reactor (Biic-Bianchi) at 150°–170° C. until 36 g water are removed azeotropically. The intermediate thus obtained is an amide being amino terminated in both ends and having a NH value corresponding to 2.0 equivalents $NH_2$/mole.

At 170° C., 3501 g commercial 12-hydroxystearic acid (acid value 180 mg KOH/g, hydroxyl value 150 KOH/g), are introduced and heated while stirring at 175° C.–180° C. until at least 6.5 equivalents water are removed azeotropically. The intermediate product shows at least a hydroxyl value corresponding to 1.2–1.25 equivalents OH/mole of the intermediate. At 180° C., 29.168 g 12-hydroxystearic acid (acid value 180 mg KOH/g, hydroxyl value 150 mg KOH/g) are introduced and heated while stirring at 210°–220° C., until the total amount of the water separated azeotropically is corresponding to 89.34 equivalents and the acid value of the polyesteramide product thus obtained is corresponding to 8.27 equivalents/mole of the product.

The toluene is removed by distillation under vacuum at 220° C., then the temperature is lowered to 130° C. At 130° C., 642.82 g alkylpropylene diamine (Duomeen T) are introduced. The temperature is lowered to 110° C. and maintained for 1 h, giving a dispersant of composition I, wherein the molecular weight of Z+Q is 15.8%. The polyester chains in the polyester amide have the formula II wherein $x=17.7$. The product thus obtained has a final acid value corresponding to 5.99 equivalents COOH/mole of the final product.

EXAMPLE 6

Under nitrogen atmosphere, a mixture of 150 g toluene, 402.62 g 11-aminoundecanoic acid and 396 g alkylpropylene diamine (Duomeen T), is heated while stirring in a 20 liters glass flask at 150°–170° C. until 36 g water are removed azeotropically.

The intermediate thus obtained is a polyamide being amino terminated in both ends, and having a NH value corresponding to 2.2 equivalents $NH_2$/mole.

At 170° C., 748 g commercial 12-hydroxyoctadecanoic acid (acid value 180 mg KOH/g, hydroxyl value 155 KOH/g) are introduced and heated while stirring at 175° C.–180° C. until at least 2.2 equivalents water are removed azeotropically. The intermediate product shows at least a hydroxyl value corresponding to 1.8–2 equivalents OH/mole of the intermediate.

At 180° C., 7400 g commercial 12-hydroxyoctadecanoic acid (acid value 180 mg KOH/g, hydroxyl value 155 mg KOH/g), are introduced and heated while stirring at 210° C.–220° C. until the total amount of the water separated azeotropically is corresponding to 26.7 equivalents and the acid value of the polyesteramide product thus obtained is corresponding to 1.44 equivalents COOH/mole of the product.

The toluene is removed by distillation under vacuum at 220° C., then the temperature is lowered to 130° C. At 130° C., 173 g alkylpropylene diamine are introduced. The temperature is lowered to 110° C. and maintained for 1 h, giving a dispersant of the formula I wherein the molecular weight of Q+Z is 8.1%. The polyester chains in the polyesteramide have the formula II wherein $x=10.6$.

EXAMPLE 7

Under nitrogen atmosphere, a mixture of 250 g toluene, 402.62 g 11-aminoundecanoic acid and 396 g alkylpropylene diamine (Duomeen T), is heated while stirring in a 20 liters glass flask at 150°–170° C. until 36 g water are removed azeotropically.

The intermediate thus obtained is a polyamide being amino terminated in both ends and having a NH value corresponding to 1.8–2 equivalents $NH_2$/mole.

At 170° C., 748 g commercial 12-hydroxystearic acid (acid value 180 mg KOH/g, hydroxyl value 150 mg KOH/g) are introduced and heated while stirring at 175° C.–180° C. until at least 2.2 equivalents water are removed azeotropically. The intermediate product shows at least a hydroxyl value corresponding to 1.8–2 equivalents OH/mole of the intermediate. At 180° C., 10,000 g 12-hydroxystearic acid (acid value 180 mg KOH/g, hydroxyl value 150 mg KOH/g) and 500 g of a mixture of 12-hydroxystearic acid and hydrogenated castor oil (acid value 4 mg KOH/g, hydroxyl value 155 mg KOH/g) are introduced and heated while stirring at 210°–220° C., until the total amount of the water separated azeotropically is corresponding to 34.32 equivalents, and the acid value of the polyesteramide product thus obtained is corresponding to 2.22 equivalents COOH/mole of the product.

The toluene is removed by distillation under vacuum at 220° C., then the temperature is lowered to 130° C. At 130° C., 280 g alkylpropylene diamine (Duomeen T) are introduced. The temperature is lowered to 110° C. and maintained for 1 h, in order to form Z+Q simultaneously.

EXAMPLE 8

Under nitrogen atmosphere, a mixture of 1000 g toluene, 402.62 g 11-aminoundecanoic acid and 396.20 g alkylpropylene diamine (Duomeen T), is heated while stirring in a 70 liters polymer reactor (Biic-Bianchi) at 150°–170° C. until 36 g water are removed azeotropically. The intermediate thus obtained is a polyamide being amino terminated in both ends and having a NH value corresponding to 2.2 equivalents $NH_2$/mole.

At 170° C., 690 g commercial 12-hydroxystearic acid (acid value 180 mg KOH/g, hydroxyl value 150 KOH/g) are introduced and heated while stirring at 175° C.–180° C. until at least 2.2 equivalents water are removed azeotropically. The intermediate product shows at least a hydroxyl value corresponding to 1.8–2 equivalents OH/mole of the intermediate.

At 180° C., 41,014 g of commercial 12-hydroxystearic acid (acid value 180 mg KOH/g, hydroxyl value 150 mg KOH) are introduced together with 8,296 g of a mixture of 12-hydroxystearic acid and hydrogenated castor oil (acid value 4 mg KOH/g, hydroxyl value 155 mg KOH/g), and heated while stirring at 210°–220° C., until the total amount of the water separated azeotropically is corresponding to 936.43 equivalents. Then are added 1,185.16 g of oleic acid having an equivalent weight of 282.45 at 220° C. and the product is heated furthermore at 220° C. until the total amount of the water separated azeotropically is corresponding to 138.6 equivalents and the acid value of the polyesteramide product thus obtained is corresponding to 2 equivalents COOH/mole of the product.

The toluene is removed by distillation under vacuum at 220° C. then the temperature is lowered to 130° C. At 130° C., 365 g alkylpropylene diamine (Duomeen T) are introduced. The temperature is lowered to 110° C. and maintained for 1 h, giving a dispersant of composition I, wherein the molecular weight of Q+Z is 1.9%. The polyester chains in the polyesteramide have the formula II, wherein $x=67.2$.

EXAMPLE 9

Under nitrogen atmosphere, a mixture of 200 g toluene, 362 g decamethylene diamine and 146.14 g hexanedioic acid, is heated while stirring in a 10 liters glass flask at 150°–170° C. until 36 g water are removed azeotropically. The intermediate thus obtained is a polyamide being amino terminated in both ends and having a NH value corresponding to 2.2 equivalents $NH_2$/mole.

At 170° C., 720 g 12-hydroxy-octadecanoic acid (acid value 180 mg KOH/g, hydroxyl value 160 mg KOH/g) are introduced and heated while stirring at 175°–180° C. until at least 2.2 equivalents water are removed azeotropically.

The intermediate product shows at least a hydroxyl value corresponding to 1.8–1.9 equivalents OH/mole of the intermediate. At 180° C. 6,200 g commercial 12-hydroxystearic acid (acid value 180 mg KOH/g, OH value 150 mg KOH/g) are introduced and heated while stirring at 210°–220° C. until the total amount of the water separated azeotropically is corresponding to 22.7 equivalents and the acid value of the polyesteramide product thus obtained is corresponding to 1.38 equivalents COOH/mole of the product. The toluene is removed by distillation under vacuum at 220° C., then the temperature is lowered to 130° C. At 130° C., 170 g alkylpropylene diamine (Duomeen T) are introduced. The temperature is lowered to 110 deg. C. and maintained for 1 h giving a dispersant of composition I, wherein the molucular weight of Q+Z is 10%. The polyester chains in the polyesteramide have the formula II, wherein $x=10$.

EXAMPLE 10

Under nitrogen atmosphere, a mixture of 200 g toluene, 425 g 1,12-diaminododecane and 202.25 g sebacic acid is heated while stirring in a 10 liters glass flask at 150°–170° C. until 36 g water are removed azeotropically. The intermediate thus obtained is a polyamide being amino terminated in both ends and having a NH value corresponding to 2.2 equivalents $NH_2$/mole. At 170° C., 748 g 12-hydroxy-octadecanoic acid (acid value 180 mg KOH/g, hydroxyl value 155 mg KOH/g) are introduced and heated at 175°–180° C. until at least 2.3 equivalents water are removed azeotropically. The intermediate product shows at least a hydroxyl value corresponding to 1.8–1.9 equivalents OH/mole of the intermediate. At 180° C., 7400 g commercial 12-hydroxystearic acid (acid value 180 mg KOH/g, OH value 150 mg KOH/g) are introduced and heated while stirring at 210°–220° C. until the total amount of the water separated azeotropically is corresponding to 26.7 equivalents and the acid value of the polyesteramide product thus obtained is corresponding to 1.44 equivalents COOH/mole of the product.

The toluene is removed by distillation under vacuum at 220° C., then the temperature is lowered to 130° C. At 130° C., 173 g alkylpropylene diamine (Duomeen T) are introduced. The temperature is lowered to 110° C. and maintained for 1 h, giving a dispersant of composition I, wherein the molecular weight of Q+Z is 7%. The polyester chains of the polyesteramide have the formula II, wherein $x=10.6$.

EXAMPLE 11

In a 1 liter glass flask, under nitrogen atmosphere, 226.35 g ε-caprolactam are dissolved in 200 g anhydrous ethanol and then heated at 50° C. for 10 minutes under reflux of solvent. 18 g distilled water are added, then the mixture is heated at 80° C., and while adding 100 g toluene, the temperature is raised to 120° C. and maintained until 16.2 g water are separated azeotropically, together with 200 g ethanol.

At 120° C., 116.21 g of hexamethylene diamine are introduced. The product is then heated at 150°–160° C.

until another 20 g water are separated azeotropically. The intermediate thus obtained is a polyamide being amino terminated in both ends and having a NH value corresponding to 2.2 $NH_2$ equivalents/mole of the intermediate. At 160° C. the intermediate together with 650 g commercial 12-hydroxystearic acid (acid value 180 mg KOH/g, OH value 150 mg KOH/g) are introduced and heated while stirring at 175°-180° C. until at least 2 equivalents water are removed azeotropically. The intermediate product shows at least a hydroxyl value corresponding to 1.6-1.65 equivalents OH/mole of the intermediate. At 180° C. 5,500 g 12-hydroxystearic acid (acid value 180 mg KOH/g, OH value 150 mg KOH/g) are introduced and heated while stirring at 210°-220° C. until the total amount of the water separated azeotropically is corresponding to 18.4 equivalents and the acid value of the polyesteramide product thus obtained is corresponding to 1.3 equivalents COOH/mole of the product.

The toluene is removed by distillation under vacuum at 220° C., then the temperature is lowered to 130° C.

The temperature is lowered to 110° C. and maintained for 1 h, giving a dispersant of composition I, wherein the molecular weight of Q+Z is 9%. The polyester chains in the polyesteramide have the formula II wherein $x=8$,

EXAMPLE 12

Under nitrogen atmosphere a mixture of 318.5 g of 8-aminooctanoic acid and 100 g ethanol is heated while stirring at 80° C. in a 1 liter glass flask until the amine is dissolved. The temperature is then raised to 180° C. replacing ethanol with 100 g toluene. The temperature is maintained at 180° C. until 16 g water are separated azeotropically, together with 100 g ethanol. The temperature is lowered to 130° C. and 365 g alkylpropylene diamine (Duomeen T) are introduced. Heating at 150°-165° C. another 19.96 g water are separated. The intermediate thus obtained is a polyamide being amino terminated in both ends and having a NH value corresponding to 2 equivalents $NH_2$/mole. At 165° C. the intermediate is poured into a 10 liters glass flask together with 650 g commercial 12-hydroxystearic acid (acid value 180 mg KOH/g, hydroxyl value 150 mg KOH/g) another 250 g toluene, and heated while stirring at 175°-180° C. until another 2.09 equivalents water are separated azeotropically. The intermediate product shows at least a hydroxyl value corresponding to 1.6-1.7 equivalents OH/mole of the intermediate. At 180° C. 5500 g 12-hydroxystearic acid (acid value 180 mg KOH/g, hydroxyl value 150 mg KOH/g), are introduced and heated while stirring at 210°-220° C. until another 16.34 equivalents water are separated azeotropically and the acid value of the polyesteramide product thus obtained is corresponding to 1.3 equivalents COOH/mole of the product.

The toluene is removed by distillation under vacuum at 220° C., then the temperature is lowered to 130° C.

At 130° C., 157.50 g alkylpropylene diamine (Duomeen T) are introduced. The temperature is lowered to 110° C. and maintained for 1 h, giving a dispersant of Composition I, wherein the molecular weight of Q+Z is 8.4%. The polyester chains of the polyesteramide have the formula II, wherein $x=8$.

EXAMPLE 13

Under nitrogen atmosphere a mixture of 250 g toluene, 720 g alkylpropylene diamine (Duomeen T) and 202.25 g sebacic acid is heated while stirring at 150°-165° C. in a 10 liters glass flask until 36 g water are separated azeotropically. The intermediate thus obtained is a polyamide being amino terminated in both ends having a NH value corresponding to 2 equivalents NH/mole. At 165° C., commercial 12-hydroxystearic acid (acid value 180 mg KOH/g, hydroxyl value 150 mg KOH/g) are introduced and heated while stirring at 190° C. until 2 equivalents water are separated azeotropically. The intermediate product shows at least a hydroxyl value corresponding to 1.6-1.7 equivalents OH/mole of the intermediate. At 190° C. 8000 g 12-hydroxystearic acid (acid value 180 g KOH/g, hydroxyl value 150 mg KOH/g) are introduced together with 500 g of a mixture of 12-hydroxystearic acid and hydrogenated castor oil (acid value 4 mg KOH/g 155 mg KOH/g) and heated while stirring at 210°-220° C., until the total amount of the water separated azeotropically is corresponding to 28.4 equivalents and the acid value of the polyesteramide product thus obtained is corresponding to 1.3 equivalents COOH/mole of the product.

The toluene is removed by distillation under vacuum at 220° C., then the temperature is lowered to 130° C.

At 130°, 160 g alkylpropylene diamine (Duomeen T) are introduced. The temperature is lowered to 110° C. and maintained for 1 h, giving a dispersant of Composition I, wherein the molecular weight of Q+Z is 6%. The polyester chains of the polyesteramide have the formula II wherein $x=12$.

EXAMPLE 14

Under nitrogen atmosphere, a mixture of 100 g toluene, 232.42 g hexamethylene diamine and 240.30 g L-cystine is heated while stirring at 170° C. until 36 g water are separated azeotropically. The product thus obtained is a diamide-disulfo-tetraamine of the formula IX wherein $d=d_1=6$ and $R_1=R_2=H$ having a NH value corresponding to 3.9-4.1 equivalents $NH_2$/mole of the intermediate.

A mixture of 250 g toluene, 8000 g commercial 12-hydroxyoctadecanoic acid (acid value 180 mg KOH/g, hydroxyl value 150 mg KOH/g) and 850 g of a mixture of 12-hydroxystearic acid and hydrogenated castor oil (acid value 4 mg KOH/g, hydroxyl value 155 gm KOH/g) is heated at 210°-220° C. until 427.5 g water are separated azeotropically. The product thus obtained is a polyester of the formula II, wherein $x=10.8$ and having an acid value corresponding to 1.05 equivalents COOH/mole of the intermediate.

The temperature is lowered to 160° C. and then are added 45.8 g alkylpropylene diamine (Duomeen T). At 160° C. the diamidedisulfotetraamine is added to the mixture of polyester and diamine and the temperature is maintained at 170°-175° C. until 36 g water are separated azeotropically. A dispersant of Composition I is obtained wherein the molecular weight of Q+Z=1.83%. The polyester chains of the polyesteramide have the formula II, wherein $x=10.8$.

EXAMPLE 15

Under nitrogen atmosphere in a 10 liters glass flask 565.8 g ε-caprolactam are dissolved in 500 g anhydrous ethanol and then heated at 50° C. for 10 minutes under reflux of solvent. 90 g distilled water are added, then the mixture is heated at 80° C., and while adding 250 toluene the temperature is raised to 120° C. and maintained until 68.4 g water are separated azeotropically, together with 500 g ethanol. The temperature is lowered to 130° C. and 116.21 g hexamethylene diamine are introduced. Heating at 150°–165° C. another 21.6 g water are separated. The intermediate thus obtained is a polyamide being amino terminated in both ends and having a NH value corresponding to 2 equivalents NH₂/mole. At 165° C. 650 g commercial 12-hydroxystearic acid (acid value 180 mg KOH/g, hydroxyl value 150 mg KOH/g) are introduced and heated while stirring at 175°–180° C. until another 2.09 equivalents water are separated azeotropically. The intermediate product thus obtained shows at least a hydroxyl value corresponding to 1.6–1.7 equivalents OH/mole of the intermediate. At 180° C., 5500 g 12-hydroxystearic acid (acid value 180 mg KOH/g, OH value 150 mg KOH/g) are introduced and heated while stirring at 210°–220° C. until another 16.34 equivalents water are separated azeotropically and the acid value of the polyesteramide product thus obtained is corresponding to 1.3 equivalents COOH/mole of the product.

The toluene is removed by distillation under vacuum at 220° C., then the temperature is lowered to 130° C. At 130° C., 157.50 g alkylpropylene diamine (Duomeen T) are introduced. The temperature is lowered to 110° C. and maintained for 1 h giving a dispersant of Composition I, wherein the molecular weight of Q+Z is 8.2%. The polyester chains of the polyesteramide have the formula II, wherein x=8.2.

EXAMPLE 16

Under nitrogen atmosphere, a mixture of 200 g toluene, 402.62 g 11-aminoundecanoic acid and 147.05 g 1,3-diaminopropane dihydrochloride, are heated while stirring at 200° C. until 2 equivalents HCl and 2 equivalents water are separated azeotropically. The intermediate thus obtained is a polyamide being amino terminated in both ends and having a NH value corresponding to 2 equivalents NH₂/mole. At 200° C., 650 g commercial 12-hydroxystearic acid (acid value 180 mg KOH/g, OH value 150 mg KOH/g) are introduced and stirred while heating at 200° C. until 2.09 equivalents water are separated azeotropically.

The intermediate product thus obtained shows at least a hydroxyl value corresponding to 1.64 equivalents OH/mole of the intermediate. At 200° C., 5500 g 12-hydroxystearic acid (acid value 180 mg KOH/g, OH value 150 mg KOH/g) are introduced and heated while stirring at 210°–220° C. until 16.34 equivalents water are separated azeotropically and the acid value of the polyesteramide product thus obtained is corresponding to 1.3 equivalents COOH/mole of the product.

The toluene is removed by distillation under vacuum at 220° C., then the temperature is lowered to 130° C. At 130° C., 157.50 g alkylpropylene diamine (Duomeen T) are introduced. The temperature is lowered to 110° C. and maintained for 1 h giving a dispersant of Composition I, wherein the molecular weight of Q+Z is 8.7%. The polyester chains of the polyesteramide have the formula II wherein x=8.2%.

EXAMPLE 17

Under nitrogen atmosphere, a mixture of 250 g toluene, 146.14 g hexanedioic acid and 362 g decamethylene diamine, is heated while stirring in a 20 liters glass flask at 150°–170° C. until 36 g water are removed azeotropically. The intermediate thus obtained is a polyamide being amino terminated in both ends and having a NH value corresponding to 2.2 equivalents NH₂/mole.

At 170° C., 720 g 11-hydroxystearic acid (acid value 184 mg KOH/g, hydroxyl value 175 mg KOH/g) are introduced and heated while stirring at 175°–180° C. until at least 2.3 equivalents water are removed azeotropically. The intermediate product shows at least a hydroxyl value corresponding to 2–2.1 equivalents OH/mole of the intermediate.

At 180° C., 7000 g commercial 12-hydroxystearic acid (acid value 180 mg KOH/g, hydroxyl value 150 mg KOH/g) and 1300 g of the above mentioned 11-hydroxystearic acid are introduced and heated while stirring at 210°–220° C. until the total amount of the water separated azeotropically is corresponding to 29.21 equivalents and the acid value of the product thus obtained is corresponding to 1.87 equivalents COOH/mole of the product.

The toluene is removed by distillation under vacuum at 220° C., then the temperature is lowered to 130° C. At 130° C. 240 g alkylpropylene diamine (Duomeen T) are introduced. The temperature is lowered to 110° C. and maintained for 1 h giving a dispersant of Composition I wherein the molecular weight of Q+Z is 9%. The polyester chains of the polyesteramide have the formula II wherein x=12.6.

EXAMPLE 18

Under nitrogen atmosphere, a mixture of 250 g toluene, 318.5 g 8-amino-octanoic acid and 120 g hexamethylene diamine, is heated while stirring in a 10 liters glass flask at 150°–170° C. until 36 g water are removed azeotropically. The intermediate thus obtained is a polyamide being amino terminated in both ends and having a NH value corresponding to 2.06 equivalents NH₂/mole.

At 170° C., 650 g of synthetic 12-hydroxyoctadecanoic acid, derived from reaction of 3-hydroxynonanoic acid, acetylchloride and undecane dicarboxylic acid monomethylester, (having a COOH equivalent of 301.61 and OH equivalent of 320.57) are introduced and heated while stirring at 175°–180° C. until at least 2.1 equivalents water are removed azeotropically. The intermediate product shows at least a hydroxyl value corresponding to 1.93–1.95 equivalents OH/mole of the intermediate. At 180° C., 4000 g commercial ricinoleic acid, (COOH equivalent 303.2, OH equivalent 362), and 3500 g of the above mentioned 12-hydroxyoctadecanoic acid, are introduced and heated while stirring at 210°–220° C. until the total amount of the water separated azeotropically is corresponding to 28.05 equivalents and the acid value of the polyesteramide product thus obtained is corresponding to 1.29 equivalents COOH/mole of the product.

The toluene is removed by distillation under vacuum at 220° C., then the temperature is lowered to 130° C. At 130° C., 160 g alkylpropylene diamine (Duomeen T) are introduced. The temperature is lowered to 110° C. and maintained for 1 h giving a dispersant of Composition I wherein the molecular weight of Q+Z=6.8%. The polyester chains of the polyesteramide have the formula II wherein x=12.

EXAMPLE 19

Under nitrogen atmosphere, in a 15 liters glass flask provided with a mechanical stirrer and a 500 ml glass funnel placed on the top, is introduced a mixture of 300 g toluene, 322.23 g of 3,3',4,4'-benzophenonetetracarboxy dianhydride and 232.42 g of 1,6-hexanediamine.

The mixture is heated while stirring at 130° C., then, during 1 hour, from the funnel placed on the top, are introduced 258.50 g of n-octylamine. The mixture is then heated at 170° C. until 2 equivalents of water are separated azeotropically. The intermediate thus obtained is a polyamide being amino terminated in both ends and having a NH value corresponding to 2 $NH_2$ equivalents/mole of the intermediate. At 170° C. are then introduced 624 g of 12-hydroxystearic acid (acid value 180 mg KOH/g, hydroxyl value 150 mg KOH/g). The product is then heated at 180°–190° C. until 2 equivalents water are separated azeotropically. The intermediate thus obtained has a hydroxyl value corresponding to 1.67 OH equivalents/mole of the intermediate. Then are introduced 6000 g of the above mentioned hydroxystearic acid and heated at 210°–220° C. until the total amount of the water separated azeotropically is corresponding to 21.71 equivalents of water. The polyesteramide product thus obtained has an acid value corresponding to 1.54 COOH equivalents/mole of the product. The toluene is removed under vacuum at a temperature of 220° C.; the temperature is then reduced to 130° C. At 130° C. are introduced 189.42 g of alkylpropylene diamine (Duomeen T) and a dispersant of Composition I is obtained, wherein the molecular weight of Q+Z=9%. The polyester chains of the polyester amide have the formula II wherein x=8.8.

EXAMPLE 20

Under nitrogen atmosphere a mixture of 1000 g toluene, 402.62 g 11-aminoundecanoic acid and 110 g of the diethylene triamine, is heated while stirring in a 20 liters polymer reactor (Biic-Bianchi, Italy) at 150°–170° C. until 36 g water are removed azeotropically. The intermediate thus obtained is an amide being amino terminated in both ends and having a NH value corresponding to 2.15 equivalents $NH_2$/mole.

At 170° C., 748 g commercial 12-hydroxystearic acid (acid value 180 mg KOH/g, hydroxyl value 150 mg KOH/g) are introduced and heated while stirring at 175°–180° C. until at least 2.3 equivalent water are removed azeotropically.

The intermediate product shows at least a hydroxyl value corresponding to 1.74–1.80 equivalents OH/mole of the intermediate.

At 180° C., 9600 g 12-hydroxystearic acid (acid value 180 mg KOH/g, hydroxyl value 150 mg KOH/g) are introduced and heated while stirring at 200°–210° C., until the total amount of the water separated azeotropically is corresponding to 30.9 equivalents and the acid value of the polyesteramide product thus obtained is corresponding to 3.46 equivalents/mole of the product.

The toluene is removed by distillation under vacuum at 200° C. then the temperature is lowered to 130° C. At 130° C., 103.2 g neopentandiamine are introduced. The temperature is lowered to 110 deg. C. and maintained for 1 h giving a dispersant of Composition I wherein the molecular weight of Q+Z is 11.1%. The polyester chains of the polyester amide have the formula II wherein x=14.4. The salt Z has the formula

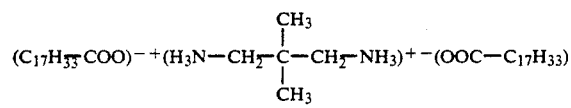

The product thus obtained has a final acid value corresponding to 1.46 equivalents COOH/mole of the final product.

EXAMPLE 21

Under nitrogen atmosphere a mixture of 1000 g toluene, 402.62 g 11-aminoundecanoic acid and 240 g of 4,7,10-trioxatridecane-1,13-diamine is heated while stirring in a 20 liters polymer reactor (Biic-Bianchi, Italy) at 150°–170° C. until 36 g water are removed azeotropically. The intermediate thus obtained is an amide being amino terminated in both ends and having a NH value corresponding to 2.18 equivalents $NH_2$/mole.

At 170° C. 748 g commercial 12-hydroxystearic acid (acid value 180 mg KOH/g, hydroxyl value 150 mg KOH/g) are introduced and heated while stirring at 175°–180° C. until at least 2.3 equivalents water are removed azeotropically. The intermediate product shows at least a hydroxyl value corresponding to 1.77–1.80 equivalents OH/mole of the intermediate.

At 180° C. 9600 g 12-hydroxystearic acid (acid value 180 mg KOH/g, hydroxyl value 150 mg KOH/g) are introduced and heated while stirring at 200°–210° C. until the total amount of the water separated azeotropically is corresponding to 30.9 equivalents and the acid value of the polyesteramide product thus obtained is corresponding to 3.43 equivalents/mole of the product.

The toluene is removed by distillation under vacuum at 200° C. and then the temperature is lowered to 130° C. At 130° C., 220.3 g 4,7,10-trioxatridecane-1,13-diamine are introduced. The temperature is lowered to 110° C. and maintained for 1 h giving a dispersant of Composition I wherein the molecular weight of Q+Z is 11.8%. The salt has the following formula

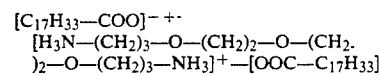

The polyester chains in the polyesteramide have the formula II wherein x=14.4. The product thus obtained has a final acid value corresponding to 1.43 equivalents COOH/mole of the final product.

EXAMPLE 22

Under nitrogen atmosphere a mixture of 250 g toluene, 40.26 g 11-aminoundecanoic acid and 84.3 g alkylpropylene diamine ("Duomeen O", an oleylpropylene diamine from Akzo, Holland) is heated while stirring in a 5 liters glass flask at 150°–170° C. until 3.6 g water are removed azeotropically. The intermediate thus obtained is an amide being amino terminated in both ends and having a NH value corresponding to 2.0 equivalents $NH_2$/mole.

At 170° C., 350 g of a mixture of 9-, 10-, 11- and 12-hydroxycarboxylic acids derived from tall oil fatty acid ("Bevacid 2" from Bergvik Kemi, Sweden), after epoxydation and hydrogenation (acid value 182 mg KOH/g, hydroxyl value 156 mg KOH/g) are introduced and heated while stirring at 175°–180° C. until at least 0.65 equivalents water are removed azeotropically. The intermediate product shows at least a hydroxyl value corresponding to 1.2–1.25 equivalents OH/mole of the intermediate.

At 180° C., 3000 g of the above mentioned hydroxycarboxylic acid (derived from tall oil fatty acids) are introduced and heated while stirring at 210°–220° C. until the total amount of water separated azeotropically is corresponding to 8.93 equivalents and the acid value of the polyesteramide product thus obtained is corresponding to 8.27 COOH equivalents/mole of the product. The toluene is removed by distillation under vacuum at 220° C. then the temperature is lowered to 130° C. At 130° C. 643.9 alkylpropylene diamine (Duomeen T) are introduced. The temperature is lowered to 110° C. and maintained for 1 h giving a dispersant of Composition I, wherein the molecular weight of Q+Z is 15.8%. The product thus obtained has a final acid value corresponding to 6 equivalents COOH/mole of the final product. The polyester chains of the polyester amide have the formula II wherein $x = 18$.

EXAMPLE 23

Under nitrogen atmosphere, a mixture of 150 g toluene, 116.20 g 1,6-hexanediamine and 296.24 g phthalic anhydride, is heated while stirring in a 10 liters glass flask at 160°-175° C. until the acid value of the product is corresponding to 2 equivalents COOH/mole of the intermediate. At 175° C., 232.4 g 1,6-hexanediamine are introduced and heated at 180°-190° C. until 2 equivalents water are separated azeotropically, and the NH value of the product is corresponding to 2 equivalents $NH_2$/mole. A polyamide of the formula XIII is obtained, wherein $d = d_1 = 6$ and $R_1 = H$.

At 190° C., 8568 g commercial 12-hydroxystearic acid (acid value 180 mg KOH/g, hydroxyl value 157 mg KOH/g) are introduced and heated while stirring at 210°-220° C. until the total amount of the water separated azeotropically is corresponding to 27.8 equivalents, and the acid value of the polyesteramide product thus obtained is corresponding to 1.52 equivalents COOH/mole of the product.

The toluene is removed by distillation under vacuum at 220° C., then the temperature is lowered to 130° C. At 130° C., 276 g alkylpropylene diamine (Duomeen T) are introduced. The temperature is lowered to 110° C. and maintained for 1 h, giving a dispersant of Composition I, wherein the molecular weight of Z+Q is 8.41%. The polyester chains in the polyesteramide have the formula II wherein $x = 12$.

EXAMPLE 24

Under nitrogen atmosphere, a mixture of 150 g toluene, 384.26 g trimellitic anhydride and 116.2 g 1,6-hexanediamine, is heated while stirring in a 10 liters glass flask at 160°-175° C. Until the acid value of the product is corresponding to 4 equivalents COOH/mole of the intermediate. At 175° C., 398.8 g isotridecylamine are introduced and stirred at 180°-190° C. until 2 equivalents water are separated azeotropically, and the acid value of the product is corresponding to 2 equivalents COOH/mole. At 190° C., 232.40 g 1,6-hexanediamine are introduced and heated while stirring at 190° C. until 2 equivalents water are separated azeotropically, and the NH value of the intermediate is corresponding to 2 equivalents $NH_2$/mole. A polyamide of the formula XIV is obtained wherein $d = d_1 = 6$, $d_2 = 12$ and $R_1 = H$.

At 190°, 8568 g commercial 12-hydroxystearic acid (acid value 180 mg KOH/g, hydroxyl value 157 mg KOH/g) are introduced and heated while stirring at 210° C.-220° C. until the total amount of the water separated azeotropically is corresponding to 29.9 equivalents, and the acid value of the polyesteramide product thus obtained is corresponding to 1.51 equivalents COOH/mole of the product.

The toluene is removed by distillation under vacuum at 220° C., then the temperature is lowered to 130° C. At 130° C., 276 g alkylpropylene diamine (Duomeen T) are introduced. The temperature is lowered to 110° C. and maintained for 1 h, giving a dispersant of composition I, wherein the molecular weight of Z+Q is 7.87%. The polyester chains in the polyesteramide have the formula II wherein $x = 12$.

EXAMPLE 25

Under nitrogen atmosphere, a mixture of 150 g toluene, 174.3 g N,N'-bis(3-aminopropyl)-1,2-ethanediamine and 648 g of rosin acids (having an acid value of 173 mg KOH/g, prevalently represented by 49.5 parts abietic acid, 19.5 parts palustric acid and 16.3 parts neoabietic acid), is heated while stirring, in a 10 liters glass flask, at 180° C.-190° C., until 2 equivalents water are separated azeotropically, and the acid value of the product is corresponding to 0.02 equivalents COOH/mole. A polyamide of the formula XV is obtained wherein $g = g_2 = 3$, $g_1 = 2$.

At 190° C., 8568 g commercial 12-hydroxystearic acid (acid value 180 mg KOH/g, hydroxyl value 157 KOH/g) are introduced and heated while stirring at 210° C.-220° C., until the total amount of the water separated azeotropically is corresonding to 25.9 equivalents and the acid value of the polyesteramide product thus obtained is corresponding to 1.51 equivalents COOH/mole of the product. The toluene is removed by distillation under vacuum at 220° C., then the temperature is lowered to 130° C. At 130° C., 276 g alkylpropylene diamine (Duomeen T) are introduced. The temperature is lowered to 110° C. and maintained for 1 h, giving a dispersant of composition I, wherein the molecular weight of Z+Q is 8.11%. The polyester chains in the polyesteramide have the formula II wherein $x = 12$.

In the following examples the use of the dispersants prepared in Examples 1-25 is illustrated. Parts and percentages are based on the weight unless otherwise stated. It should be noted that all dispersing agents of the invention can be used in all the following examples giving the stated advantages.

EXAMPLE 26

After diazotisation and coupling for preparing a pigment Red 57, (C.I. No. 15850), and after having pressed a press cake, containing 155 kg pure dyestuff, derived from the above mentioned chemical reactions, through a 28 frames filter (120×115.3 cm) at 50° C., the product is dissolved in 16,000 liters condensed water at 95° C. in a 30 m³ stirring vat. The solution should be clear. 16 kg of the product prepared according to Example 1 is added as a 20% water emulsion obtained by using a non-ionic surfactant, after previous heating at 60° C. Stirring is continued until the temperature falls to 70° C. and then is added, 16 kg rosin soap in an approximately 10% solution.

After 5 minutes stirring, 60 kg calcium chloride as a 10% solution is blown over from a pressure vessel. After stirring for ½ hour at 70° C. and then raising the temperature to 80° C. for another ½ hour, this temperature is maintained for ½ hour and the product pressed by the aid of a centrifugal pump. After filter pressing through a 42 frames (120×115.3 cm) filter, the press cake is about 22% and is dried in an air circulated stove, (Wilma, Haas, Schilde) at about 60° C., 70° C. at the most. After drying the product is ground and micronized.

The easily dispersible pigment thus obtained can be milled on a 3 roller mill or through a Netzsch pearl mill, feeded by a peristaltic pump, after a predispersion, by means of a high speed mixer, in mineral oil PKWF 210/230 (from Hallermann AG, Germany) or toluene at 50–60% concentration.

The rheological properties and the tinctorial strength of lithographic and rotogravure printing inks are better than those provided by the untreated pigment Red 57.

EXAMPLE 27

1200 g of filtercake made according to example 26, containing 30% of treated pigment Red 57,1 (C.I. No. 15850) are introduced into a 5 liters laboratory kneader mixer (with 2 Z blades and a 2.5 horsepower motor) of "W. & P" type, provided with vacuum and heat/cooling system, at a temperature of 60° C. Under stirring at low speed 360 g mineral oil PKWF 210/230 are introduced. When 70% of the total water amount contained in the filtercake has been flushed out and discharged from the mixer, another 1200 g filtercake are added. Then are added 200 g of mineral oil PKWF 210/230, stirring at low speed. After more water being flushed out and discharged from the mixer, another 1200 g filtercake are added. Then added 160 g PKWF 210/230 slowly under stirring. After more water being flushed out and discharged from the mixer, the total amount of the separated water is 75% of the theoretical amount of water contained in the whole filtercake.

The mixer is settled under vacuum (15 mm Hg residual pressure) at 85° C. until the water content of the product is at most 2% by water testing.

The product thus obtained is a fluid paste containing 60% red deflocculated pigment particles finely divided in 40% PKWF 210/230. The product is excellently suitable for use in e.g. lithographic printing inks and gravure printing inks.

EXAMPLE 28

Solution 1: 67 parts of acetoacetanilide dissolved in a solution of 28.2 parts sodium hydroxide in 900 parts of water. Solution 2: 43.5 parts of 3,3-dichlorobenzidine tetrazotised in the usual manner with 24.1 parts of sodium nitrite in 800 parts of water at 0° C.

Suspension 3: 8.2 parts of 5,5-dimethyl-4,4-diamino-2,2-biphenyl disulphonic acid tetrazotised in the usual manner with 3.4 parts sodium nitrite in 250 parts of water at 0° C.

10% of solution 1 is put into a coupling vessel and the suspension 3 is added during 10 minutes, care being taken that at no time any substantial quantity of uncoupled tetrazo compound is present. The remainder of solution 1 and solution 2 are added simultaneously to the reaction mixture during 1 hour. The reaction temperature is maintained at ambient temperature, and the pH between 4.5 and 4.8, no substantial quantity of uncoupled tetrazo compound being present. A solution of 14 parts of alkylpropylene diamine (Duomeen T) in 25 parts of glacial acetic acid and 1000 parts of water and then 14 parts of the product prepared according to Example 2, as a 17% water/nonionic surfactant emulsion heated at 60° C., are added to the coupling vessel under good stirring. The reaction mixture is then brought to the boil, and boiled for 30 minutes. The pH of the reaction mixture slurry, after this boiling, is adjusted to 10, with sodium hydroxide solution at 70° C. The pigment composition of pigment Yellow 12 (C.I. No. 21090) is filtered off, washed with water and dried at 50°–55° C. The pigment thus obtained can be milled on a 3 roller mill or through a Netzsch pearl mill, fed by a peristaltic pump, after a predispersion done by a high speed mixer, in mineral oil PKWF 210/230 or toluene. Dispersability, rheological properties and the tinctorial strength of lithographic and rotogravure printing inks are better than those provided by an untreated pigment Yellow 12, even when a water azo dyestuff is added together with the same amount of the above mentioned amine.

EXAMPLE 29

1200 g filtercake, containing 30% of the pigment produced according to Example 28, are introduced into a 5 liters laboratory kneader mixer (with 2 Z blades and a 2.5 horsepower motor) of "W. & P." type, provided with vacuum, and heat/cooling system, heated to 40° C. Under stirring at low speed are added 360 g PKWF 210/230. When 70% of the total water amount contained in the filtercake has been flushed out and discharged from the mixer, another 1200 g filtercake are added. Then are added 360 g PKWF 210/230, stirring at low speed. After more water being flushed being flushed out and discharged from the mixer, another 1200 g filtercake are added. Then 360 g of PKWF 210/230 are added slowly under stirring. After more water being flushed out and discharged from the mixer, the total amount of the separated water is 75% of the theoretical amount of water contained in the whole filtercake. The mixer is settled under vacuum (10 mm Hg residual pressure) at 50° C. until the water content of the product is at most 2% by water testing. The product thus obtained is a fluid paste containing 50% yellow deflocculated finely divided pigment particles and 50% PKWF 210/230. The product is suitable for use in e.g. lithographic printing inks and gravure printing inks.

EXAMPLE 30

Similar procedures as described in Examples 28–29 can be carried out for the production of pigment Yellow 13 (C.I. No. 21100), and concentrated pastes containing the above mentioned pigment, when are present:

1. 5% to 12% of water soluble azo dyestuff, based on the pigment weight, or its sodium salt, prepared by coupling 4,4-diamino-2,2-biphenyl disulphonic acid, tetrazotised at 0° C. with sodium nitrite in water with acetoacet-m-xylidide, dissolved in dilute sodium hydroxide solution;

2. a solution of 5% to 14%, based on the pigment weight, of alkylpropylene diamine (Duomeen T) in glacial acetic acid/water colloidal dispersion;

3. 8% to 17%, based on the pigment weight, of one of the dispersants prepared according to Examples 1–22 as a 17–20% water/nonionic surfactant emulsion.

Best results as to application properties are obtained when the water soluble azo dyestuff is added before the coupling stage and the amine/dispersant treatment is done after the coupling stage.

Pigments thus obtained can be milled or flushed as described in Examples 25 and 26. Rheological, and dispersibility properties, tinctorial strength of lithographic and rotogravure printing inks are better than those provided by untreated pigments Yellow 13, even when a water azo dyestuff is added alone or together with the same amount of the amine described above under 2.

EXAMPLE 31

An introduction of a dispersing agent described in the present invention, is very suitable to increase the dispersibility and to improve the rheological properties of pigments in non polar solvents and esters, increasing the concentration properties up to 50–55%, in comparison with untreated pigments, when grinded in a pearl-mill, on a three roller mill or when flushed in a kneader mixer, without affecting printability of lithographic inks. To prepare an easily dispersible pigment 7 parts of a watersoluble azo dyestuff, as a 10% aqueous slurry, having the formula

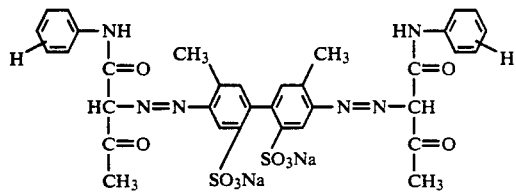

are added to a slurry containing 1000 parts water and 100 parts of pigment Yellow 14, formed by coupling 3,3-dichlorobenzidine and acetoacet-o-toluidide under stirring.

The pH is adjusted to 4.5 by the addition of 10% sodium hydroxide solution, then are added under stirring 5 parts of Duomeen T as a 10% solution in acetic acid, and 8 parts of the dispersant produced according to Example 1 (as a 20% non ionic surfactant/water emulsion heated at 60° C.).

In this process primary amines having an aliphatic radical containing from 8 to 22 carbon atoms can be used instead of Duomeen T.

EXAMPLE 32

To a slurry containing 1000 parts water and 100 parts of pigment Yellow 17, formed by coupling 3,3'-dichlorobenzidine and acetoacet-o-aniside, are under stirring added 7 parts of water-soluble azo dyestuff as a 10% aqueous slurry, having the following formula

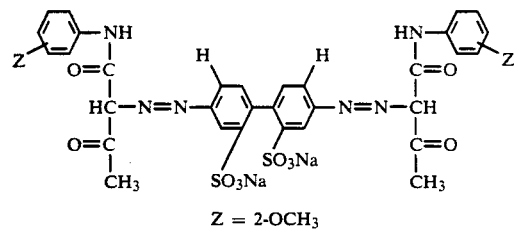

$Z = 2\text{-OCH}_3$

The pH is adjusted to 4.5 by the addition of 10% sodium hydroxide solution, then are added 5 parts Duomeen T, as a 10% solution in acetic acid, and 8 parts of the dispersant produced according to Example 2, (as a 20% nonionic surfactant/water emulsion). The pH is controlled to be 4–4.5. The mixture is then brought to the boil, and boiled for 30 minutes, the pigment composition is filtered off, washed with water and dried at 50°–55° C.

EXAMPLE 33

To a slurry containing 1000 parts water and 100 parts of pigment Yellow 81, formed by coupling 2,2',5,5'-tetrachlorobenzidine and acetoacet-2,4-xylidide, are under stirring added 7 parts of water soluble azo dyestuff, as a 10% aqueous slurry, having the following formula

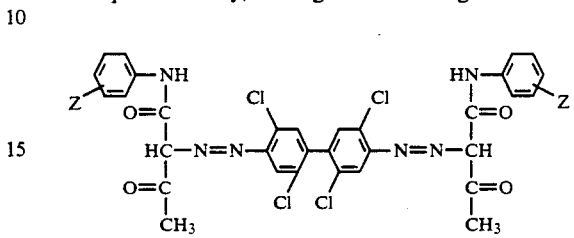

$Z = 4\text{-SO}_3\text{Na}$

The pH is adjusted to 4.5 by the addition of 10% sodium hydroxide solution, then are added 5 parts Duomeen T as a 10% solution in acetic acid, and 8 parts of the dispersant according to Example 3 (as a 20% non-ionic surfactant/water emulsion). The pH is controlled to be 4–4.5. The mixture is then brought to the boil, and boiled for 30 minutes, the pigment composition is filtered off, washed with water and dried at 50°–55° C.

EXAMPLE 34

A slurry containing 3000 parts water and 100 parts coupled pigment Orange 13 (formed by 50.6 parts 100% 3,3-dichlorobenzidine and 72 parts 1-phenyl-3-methyl-5-pyrazolone) is stirred. The pH is controlled and adjusted to 4–4.5. To the slurry are added 7 parts of a watersoluble azo dyestuff-prepared from coupling tetrazobenzidine-2,2'-disulphonic acid and
1-(p-sulpho-phenyl)-3-methyl-5-pyrazolone, as a 10% aqueous slurry, 5 parts of Duomeen T as a 10% solution in acetic acid, and 8 parts of the dispersant prepared according to Example 4 (as a 20% nonionic surfactant/water emulsion).

The pH is controlled to be 4–4.5. The mixture is then brought to the boil and boiled for one hour, filtered and washed. The pigment composition is dried at 50°–55° C.

EXAMPLE 35

To a slurry containing 2500 parts water and 100 parts pigment Orange 15 (C.I. No. 21130) are under stirring added 7 parts of watersoluble azo dyestuff, as a 10% aqueous solution, having the following formula

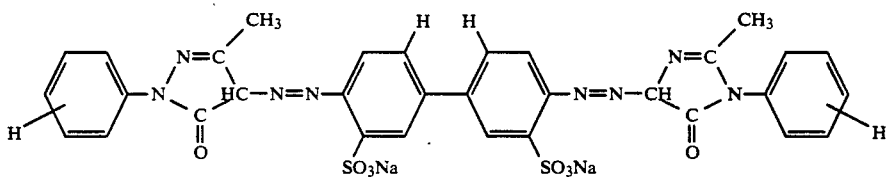

The pH is adjusted to 4.5–5. 5 parts of Duomeen T are added, as a 10% acetic acid solution, together with 8 parts of the product prepared according to Example 5, (as a 20% nonionic surfactant/water emulsion). The pH is controlled to be 4.5–5. The mixture is then brought to the boil and boiled for 45 minutes, filtered and washed. The pigment composition is dried at 50°–55° C.

EXAMPLE 36

To a slurry containing 2500 parts water and 100 parts pigment Red 37 (C.I. No. 21205), formed by coupling 3,3'-dimethoxybenzidine and 7-p-tolyl-3-methyl-5-pyrazolone, are under stirring added 7 parts of water-soluble azo dyestuff, as a 10% aqueous solution, having the following formula.

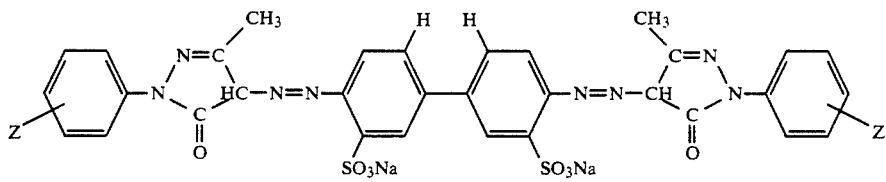

Z=4-SO$_3$Na

The pH is adjusted to 4.5-5. 5 parts of Duomeen T are added, as a 10% acetic acid solution, together with 8 parts of the product prepared according to Example 6, (as a 20% non-ionic surfactant/water emulsion). The pH is controlled to be 4.5-5. The mixture is then brought to the boil and boiled for one hour, filtered and washed. The pigment composition is dried at 50°-55° C.

EXAMPLE 37

To a slurry containing 3000 parts water and 100 parts pigment Red 41, formed by coupling 3,3'-dimethoxybenzidine and 1-phenyl-3-methyl-5-pyrazolone, are under stirring added 7 parts watersoluble azo dyestuff, as a 10% aqueous solution, having the following formula

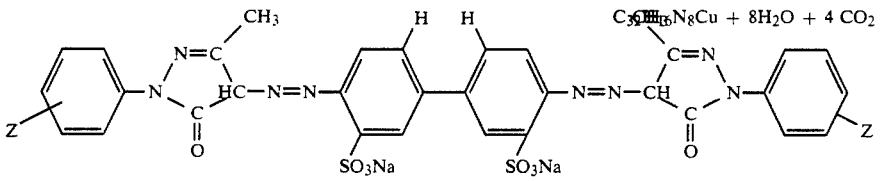

Z=4-SO$_3$Na

The pH is adjusted to 4.5-5. Then are added 5 parts of Duomeen T as a 10% solution in acetic acid, and 8 parts of the dispersant prepared according to Example 7, (as a 20% non-ionic surfactant/water emulsion). The pH is controlled to be 4.5-5. The mixture is then brought to the boil and boiled for one hour, filtered and washed. The pigment composition is dried at 50°-55° C.

EXAMPLE 38

To a slurry containing 3000 parts water and 100 parts yellow pigment, (C.I. No. 21135), are under stirring added 7 parts watersoluble azo dyestuff, as a 10% aqueous solution, having the following formula

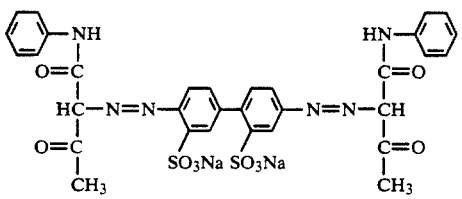

The pH is adjusted to 4-4.5. 5 parts of Duomeen T are added, as a 10% acetic acid solution, together with 8 parts of the product prepared according to Example 8, (as a 20% non-ionic surfactant/water emulsion). The pH is controlled to be 4-4.5. The mixture is then brought to the boil and boiled for one hour, filtered and washed. The pigment composition is dried at 50°-55° C.

When the procedures of Examples 31-38 are repeated with any of the products of Examples 9-17 and substituting Duomeen T with the same amount 1,4a-dimethyl-7-isopropyl-1,2,3,4,4a,9,10,10a-octahydro-1-phenanthrenemethylamine, pigments are obtained. having far better properties in comparison with not treated pigments.

EXAMPLE 39

To an aqueous slurry containing 6000 parts water of 50° C. and 100 parts salt-ground beta-copper phthalocyanine blue base P.B. 15.3 (C.I. No. 74160), or simply in a beta blue PC base slurry, prepared as follows:

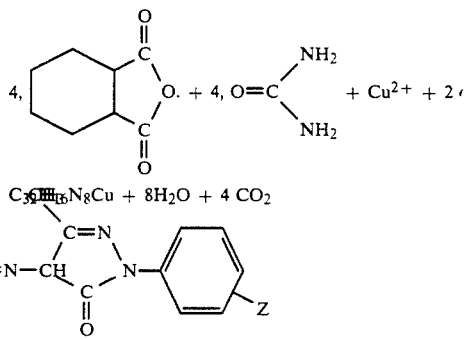

are under good stirring added 8 parts of Cu Pc (SO$_3$H) as aqueous slurry. The pH is adjusted to 5.0 by the addition of dilute hydrochloric acid or sodium hydroxide as required. Over a period of 30 minutes, 6 parts of Duomeen T as a solution in 25 parts glacial acetic acid in 1000 parts water are blown from a separate vessel.

From another separate vessel is, over a period of 30 minutes, blown 10 parts of the product prepared according to Example 9, as a 20% water/nonionic surfactant emulsion, having a temperature of 60° C. The slurry is stirred for further 30 minutes then the temperature is lowered down to 30° C., filtered from clear liquors, washed salt free with water to neutral pH, prior to drying at 50° C. 116 parts of a treated Pc beta blue pigment are obtained and then micronised. The pigment thus obtained can be milled on a 3 roller mill or through a Netzsch pearl mill, fed by a peristaltic pump, after a predispersion done by a high speed mixer, in mineral oil PKWF 210/230 or toluene or other aliphatic solvent.

The rheological properties and the tinctorial strength of lithographic and rotogravure printing inks (after completing with the respective vehicles) are better than those provided by the untreated P.B. 15.3.

EXAMPLE 40

6 parts of the product prepared according to Example 16 are dissolved in 8 parts of mineral oil (containing 22% aromates and having a boiling range of 260°–290° C.) and 86 parts of P.W. 6 (C.I. No. 77891) (e.g. RHD 2, I.C.I. or similar) are admixed and stirred with a slowly moving stirrer. After 30 minutes of predispersing, the dispersion is milled once in a 3 roller mill.

The dispersion thus obtained is fluid and contains white pigment in finely divided and deflocculated state and is excellently suitable for use in e.g. paints, lacquers and printing inks, including lithographic printing inks.

EXAMPLE 41

10 parts of the product prepared according to Example 15 are dissolved in 40 parts of the mineral oil mentioned in Example 40, and 50 parts of P.Y. 13 (C.I. No. 21090) (Isol Diaryl Yellow GRF 118 K.V.K.) are admixed with a slowly moving stirrer. After 30 minutes of predispersing, the dispersion is milled once on a 3 roller mill.

The dispersion thus obtained is a liquid dispersion in which the pigment is finely divided. The dispersion is suitable for use in printing inks, including lithographic printing inks.

EXAMPLE 42

8 parts of the product prepared according to Example 14 are dissolved in 15 parts of mineral oil (containing 15% aromates and having a boiling range of 240°–270° C.), and 77 parts of P.Y. 34 (C.I. No. 77603) are admixed with a slowly moving stirrer. After 30 minutes of predispersing, the dispersion is milled once on a 3 roller mill.

The dispersion thus obtained is fluid and contains yellow pigment in finely divided deflocculated state and is suitable for the same purposes as described in Example 40.

EXAMPLE 43

8 parts of the product prepared according to Example 13 are dissolved in 15 parts of mineral oil PKWF 240/270 (containing 19% aromates) and 77 parts of P.Y. 37 (C.I. No. 77199) are admixed with a slowly moving stirrer. After predispersing and grinding as in Example 40, the paste thus obtained is suitable for the same purposes as described in Example 40.

EXAMPLE 44

12 parts of the product prepared according to Example 12 are admixed with 5 parts of monosulphonated Cu phthalocyanine blue and 2 parts of alkylpropylene diamine (Duomeen T). After 30 minutes mixing in a high speed mixer, the mixture is milled on a 3 roller mill, until the particles of the dispersion are reduced to 5 microns.

EXAMPLE 45

19 parts of the product prepared according to Example 44 are dissolved in 23 parts of mineral oil, having a boiling range of 240°–270° C., and 58 parts of P.B. 15,3 (e.g. Chromofine Blue 4927, Dainichiseika, Japan) are admixed with a slowly moving stirrer. After 30 minutes of predispersing, the dispersion is milled once on a 3 roller mill. The dispersion thus obtained is fluid and contains blue pigment particles in finely divided and deflocculated state and is excellently suitable for use in e.g. paints, lacquers and printing inks, including lithographic printing inks.

EXAMPLE 46

19 parts of the product prepared according to Example 44 are dissolved in 23 parts of mineral oil PKWF 210/230 and 58 parts of P.B. 7 (e.g. Special Schwartz 15, Degussa, Germany). After mixing and grinding as in Example 45, the product obtained is a liquid/pasty dispersion in which the black pigment particles are deflocculated and finely divided.

The dispersion is suitable for the same purposes as the dispersion according to Example 45.

EXAMPLE 47

10 parts of the product prepared according to Example 10 are dissolved in 30 parts of mineral oil PKWF 230/260 and 58 parts of P.R. 57.1 (C.I. No. 15850) (e.g. Isol Bona Rubine 4 BK, K.V.K., Denmark) are admixed with a slowly moving stirrer (30 r.p.m.)

After 30 minutes of predispersing, the dispersion is milled once in a 3 roller mill.

The dispersion thus obtained is fluid and contains red pigment in finely divided and deflocculated state and is excellently suitable for use in printing inks, including lithographic printing inks.

EXAMPLE 48

12 parts of the product prepared according to Example 44 are dissolved in 38 parts D.O.P. and 50 parts of PB. 15.3 (C.I. No. 74160) (e.g. Irgalite Blue GLVO, Ciba-Geigy AG, Switzerland) and are admixed with a slowly moving stirrer (30 r.p.m.).

After 30 minutes of predispersing, the dispersion is milled once in a 3 roller mill.

The dispersion thus obtained is fluid and contains blue pigment in finely divided and deflocculated state and is excellently suitable for use in e.g. paints, lacquers and flexographic printing inks.

EXAMPLE 49

10 parts of the product prepared according to Example 9 are dissolved in 40 parts of D.O.P. and 50 parts of P.B. 15.4 (C.I. No. 74160) (e.g. Isol Phtalo Blue BFC 7548, K.V.K., Denmark), are admixed with a slowly moving stirrer (30 r.p.m.). After 30 minutes of predispersing, the dispersion is milled once in a 3 roller mill.

The dispersion thus obtained is fluid and contains blue pigment in finely divided and deflocculated state and is excellently suitable for use in e.g. paints, lacquers and flexographic printing inks.

EXAMPLE 50

10 parts of the product prepared according to Example 8 are dissolved in 40 parts of D.O.P. and 50 parts of P.R. 48.2 (C.I. No. 15865) (e.g. Isol Bona Red 2 BCT, K.V.K., Denmark or Seikafast red 1547, Dainichiseika, Japan) are admixed with a slowly moving stirrer (30 r.p.m.).

After the same procedure as described in Example 49 the product thus obtained has the same characteristics and uses as described in Example 49.

EXAMPLE 51

8 parts of the product prepared according to Example 7 are dissolved in 32 parts of mineral oil PKWF 210/230, previously described, and mixed with 60 parts of P.B. 27 (C.I. No. 77520) (e.g. Milori Blue 690, Dainichiseika, Japan) with a slowly moving stirrer (30 r.p.m.). After the same procedure as described in Example 42, the product obtained is a fluid paste containing blue pigments particles in finely divided and deflocculated state and being excellently suitable for use in e.g. paints and printing inks.

EXAMPLE 52

100 parts of the product prepared according to Example 6 are dissolved in 350 parts of mineral oil PKWF 240/270, and mixed with 550 parts of P.R. 81 (C.I. No. 45160:1) with a stirrer for 25 minutes at 30 r.p.m. and 15 minutes at 100 r.p.m.

The dispersion is then milled through a Netzsch pearl mill, fed by a peristaltic pump, at 200 kg/h. The dispersion thus obtained is fluid and contains pink pigment in finely divided and deflocculated state and is excellently suitable for use in e.g. paints, lacquers and printing inks, including lithographic printing inks.

EXAMPLE 53

100 parts of the product prepared according to Example 5 are dissolved in 350 parts of mineral oil PKWF 210/230; 550 parts of P.V. 3 (C.I. No. 42535:2) are admixed with a stirrer for 15 minutes at 30 r.p.m. and for 15 minutes at 100 r.p.m. The dispersion is then milled through a Netzsch pearl mill, feeded by a peristaltic pump, at 200 kg/h.

The dispersion thus obtained has the same characteristics and can be used for the same purposes as described in Example 52.

EXAMPLE 54

100 parts of the product prepared according to Example 4 are dissolved in 350 parts of mineral oil PKWF 210/230 (Haltermann) and mixed with 550 parts of P.G. 1 (C.I. No. 42040:1) with a stirrer for 15 minutes at 30 r.p.m. and for 15 minutes at 100 r.p.m.

The dispersion is then milled through a Netzsch pearl mill feeded by a peristaltic pump, at 200 kg/h.

The dispersion thus obtained has the same characteristics and uses as described in Example 52.

EXAMPLE 55

80 parts of the product prepared according to Example 3 are dissolved in 170 parts of mineral oil PKWF 210/230 and mixed with 750 parts of P.B. 6 (C.I. No. 77491) with a Silverson Mixer, provided with disintegrator head, adding the solid particles during 30 minutes.

After stirring for 1 hour 1000 parts of finely divided and deflocculated concentrated liquid paste are obtained. The paste is excellently suitable for use in e.g. paints, lacquers and printing inks.

If P.B. 6 (C.I. No. 77491) is substituted with P.W. 6 (C.I. No. 77891) a liquid paste of similar properties is obtained.

EXAMPLE 56

1200 g of filtercake containing 30% P.R. 57.1 (C.I. No. 15850) are introduced in a 5 liters laboratory kneader mixer (with 2 Z blades and 2.5 horsepower motor) of "W. & P." type, provided with vacuum and heat/cooling system, at 60° C. Under stirring at low spead are added 160 g of dispersant produced according to Example 2, together with 160 g mineral oil PKWF 240/270 (Haltermann). When 70% of the total water amount contained in the filtercake, has been flushed out and discharged from the mixer, another 1200 g filtercake are added. Then are added 210 g of mineral oil PKWF 240/270 (20% aromates), slowly and stirring at low speed. After more water is flushed out and discharged from the mixer, 1200 g more filtercake are added. Then are added 300 g of mineral oil PKWF 240/270, slowly under stirring at low speed. After more water being flushed out and discharged from the mixer, the total amount of separated water is corresponding to 75–85% of the total amount of water originally contained in the filtercake. The mixer is settled under vacuum (10–15 mm Hg residual pressure) at 80°–90° C. until the water content of the product is at most 2% by water testing.

The product thus obtained is a fluid paste containing 56.5% deflocculated finely divided pigment particles. The product is excellently suitable for use in e.g. printing inks, included lithographic printing inks.

EXAMPLE 57

In a 5 liters laboratory kneader mixer as described in Example 56, 1200 g filtercake containing 30% of P.R. 48,2 (C.I. No. 15865) are introduced at 60° C. During stirring at low speed 160 g of dispersant produced according to Example 1 are added, together with 160 g P.K.W.F. 240/270. After flushing and discharging from the mixer, the total water content in the filtercake is 70% and another 1200 g filtercake are added. Then are added 210 g of mineral oil PKWF 240/270, slowly and under stirring at low speed. After more water has been flushed out and discharged from the mixer, another 1200 g filtercake are added. Then are added 300 g of mineral oil PKWF 240/270, slowly and under stirring at low speed. When more water has been flushed out and discharged from the mixer, the total amount of separated water corresponds to 80–85% of the total amount of the water originally contained in the filtercake. The mixer is settled under vacuum (10–15 mm hg residual pressure) at 90° C. until the product has a water content of 2% at the most by water testing.

The product thus obtained is a fluid paste containing 56.5% deflocculated finely divided pigment particles and is excellently suitable for use in printing inks, including lithographic printing inks.

EXAMPLE 58

In a 5 liters laboratory kneader mixer as described in Example 56, 950 g of filtercake containing 30% of P.B. 15,3 (C.I. No. 74160, Turchese Segnale Luce NCG, supplied by Pigmenti Italia S.p.A., Italy) are introduced. At 60° C., under stirring at low speed, are added 160 g of the dispersant produced according to Example 1. After 70% of the total water contained in the filtercake is flushed out and discharged from the mixer, another 950 g filtercake are added. Then are added 200 g mineral oil PKWF 240/270, slowly and under stirring at low speed. When more water has been flushed out and discharged from the mixer, are added: 950 g of the above mentioned filtercake, 270 g of filtercake containing 25% of mono sulphonated Cu phthalocyanine blue, 30 g of Duomeen T and 220 g PKWF 240/270. When more water has been flushed out and discharged from the mixer, the total amount of the separated water is corresponding to 80–85% of the total amount originally contained in the filtercake. The mixer is settled under vacuum (10–15 mm Hg residual pressure) at 90° C., until the water content of the product is at most 2% by water testing.

The product thus obtained is a pasty/fluid concentrate containing 60% blue deflocculated finely divided pigment particles, partly as an ammonium salt or sulphonamide. The product is suitable for use in paints, lacquers and printing inks including lithographic printing inks.

EXAMPLE 59

In a 2 liters laboratory kneader mixer as described in Example 56, 926 g of filtercake containing 30% of P.Y. 13 (C.I. No. 21090) are introduced. The mixer is heated to 45° C., and then, under stirring at low speed, are added 160 g of dispersant produced according to Exampel 1. After 70% water is flushed out from the pigment and discharged from the mixer, another 926 g filtercake are added together with 200 g of mineral oil PKWF 210/230 (Haltermann), slowly and under stirring, at low speed. When more water has been flushed out and discharged from the mixer, are added: 926 g of the above mentioned filtercake, 185 g of filtercake containing 25% of the water soluble azo dyestuff described in Example 30 point 1., 40 g of Duomeen T and 220 g PKWF 240/270. When more water has been flushed out and discharged from the mixer, the total amount of the separated water is corresponding to 70-75% of the total amount of the water originally contained in the filtercake. The mixer is settled under vacuum (10 mm Hg residual pressure) at 50°-55° C., until the water content of the product is at most 2% by water testing.

The product thus obtained is a pasty/fluid concentrate containing 59% yellow deflocculated finely divided pigments particles, partly as ammonium salt or sulphonamide. The product is suitable for use in printing inks, including lithographic printing inks.

EXAMPLE 60

In a 5 liters laboratory kneader mixer described in Example 56, heated to 50° C., 1200 g of filtercake containing 30% of P.B. 18 (C.I. No. 42770:1) are introduced. Under stirring at low speed are added 160 g of the dispersant produced according to Example 6, together with 80 g PKWF 210/230. When 60% water has been flushed out from the pigment and discharged from the mixer, another 1200 g filtercake are added. Then are added 200 g of mineral oil PKWF 210/230 (Haltermann) under stirring at low speed.

When more water has been flushed out and discharged from the mixer, another 1200 g filtercake are added. Then are added 280 g of mineral oil PKWF 210/230 (Haltermann), stirring at low speed. When more water has been flushed out and discharged from the mixer, the total amount of the separated water is corresponding to 78% of the total amount, in g, originally contained in the filtercake. The mixer is settled under vacuum (10 mm Hg residual pressure) at 60° C. until the water content of the product is at most 2% by water testing. The product thus obtained is a pasty/fluid paste containing 60% blue deflocculated finely divided pigment particles. The product is excellently suitable for use in printing inks.

EXAMPLE 61

In a 5 liters laboratory kneader as described in Example 56 1160 g P.B. 7 (C.I. No. 77266, e.g. Special Schwartz 15, Degussa, Germany), 3000 g water and 200 g n-propanol are introduced and stirred at low speed for 45 min, at 20° C. Then 420 g of the dispersant produced according to Example 44 are added. Then are added 540 g of PKWF 210/230 (Haltermann). The mixer is heated at 50° C. and 85% of the water/n-propanol mixture is flushed out and discharged from the mixer. The mixer is settled under vacuum (10 mm Hg residual pressure) at 90° C. until the water content of the product is at most 0.5% by water testing.

The product thus obtained is a fluid paste containing 55% black pigment particles finely divided in mineral oil/dispersant mixture. The product is excellently suitable for use in paints, lacquers and printing inks, including litographic printing inks.

EXAMPLE 62

In a 5 liters laboratory kneader as described in Example 56, 1160 g P.B. 7 (C.I. No. 77266, particularly Regal 400 R, Cabot or Raven 1255, Columbian), 3000 g water and 200 g n-propanol are introduced and stirred at low speed for 45 min. Then 240 g of the dispersant, prepared according to Example 6, are introduced and stirred at low speed. Then 590 g PKWF 210/230 are added. The mixer is heated to 50° C. and 85% water/n-propanol mixture is flushed out from the pigment and discharged from the mixer. Then are added 30 g of Duomeen T and the mixer is settled under vacuum at 90° C. until the water content of the product is at most 2% by water testing.

The product thus obtained is a fluid paste containing 57.4% black pigment particles finely divided, in mineral oil/dispersant mixture and is excellently suitable for use in printing inks, including lithographic printing inks.

EXAMPLE 63

In a 5 liters laboratory kneader mixer as described in Example 56, heated at 50° C., 1200 g of filtercake, containing 30% PTMA Rhodamine (Pigment Violet 1, C.I. No. 45170:2), are introduced. Under stirring at low speed are introduced 160 g of dispersant produced according to Example 6, together with 80 g PKWF 230/260 (Haltermann). When 60% water has been flushed out from the pigment and discharged from the mixer, another 1200 g filtercake are added. Then are added 200 g mineral oil PKWF 230/260 under stirring at low speed.

When more water has been flushed out and discharged from the mixer, another 1200 g filtercake are added. Then are added 280 g of mineral oil PKWF 230/260, stirring at low speed. When more water has been flushed out and discharged from the mixer, the total amount of water is corresponding to 78% of the total amount, in grams, originally contained in the filtercake. The mixer is settled under vacuum (10 mm Hg residual pressure) at 60° C. until the water content of the product is at most 1% by water testing. The product thus obtained is a fluid paste containing 60% deflocculated finely divided pigment particles. The product is excellently suitable for use in printing inks.

When in this Example Pigment Violet 1 is substituted with:
I) PMTA Fanal Violet (Pigment Violet 3, C.I. No. 42535:2),
II) PMTA Victoria Blue (Pigment Blue 1, C.I. No. 42595:2),
III) PTMA Sky Blue (Pigment Blue 3 C.I. No. 42140:1);
the same concentrations for the paste are obtained as described above.

The pastes, which have fluid consistency, are suitable for use in printing inks, including litographic printing inks.

EXAMPLE 64

Into a 10 liters glass flask, under nitrogen atmosphere, are introduced 810 g dry but not yet powdered P.R. 48:2 (C.I. No. 15865) together with a mixture of 850 g methyl-ethyl-ketone, 850 g methyl-isobutyl-ketone, 850 g benzene and 140 g of the dispersant produced according to Example 1.

The mixture contained in the glass flask is heated while stirring at 80°-82° C. for 5 hours under reflux of solvent. The solvent mixture is then removed under vacuum (5 mm Hg residual pressure). The pigment is discharged from the glass flask and micronised. The pigment thus obtained is in a concentration of 60%, mixed directly in mineral oil PKWF 210/230 under stirring by a high speed mixer, in a container, at 800 r.p.m., and mixed for 30 min. After 30 min mixing, the product is milled once on a 3 roller mill or through a pearl mill (speed 200 kg/h).

The product thus obtained is suitable for use in printing inks.

EXAMPLE 65

When the procedure of Example 64 is repeated substituting the P.R. 48:2 with the following pigments: P.R. 57 (C.I. No. 15850), P.B. 18 (C.I. No. 42770:1), (C.I. No. 45170:2); Pigment Violet 3 (C.I. No. 42535), Pigment Blue 1 (C.I. No. 42595:2), Pigment Blue 3. (C.I. No. 42140:1), and substituting the dispersant of Example 1 with the dispersant of Example 14 products were obtained, which are suitable for use in printing inks, inkluding lithographic printing inks.

EXAMPLE 66

This Example is carried out in the same way and with the same type of solvents as described in Example 64, substituting the 810 g of P.R. 48:2 with 729 g P.B. 15,3 (C.I. No. 74160) and 81 g monosulphonated Cu phthalocyanine blue, and substituting 140 g of the dispersant described in Example 64 with 108 g of the dispersant produced according to Example 4 and 32 g of alkylpropylene diamine (Duomeen O).

The pigment thus obtained can be milled on a 3 roller mill or through a pearl mill (200 kg/h), at a concentration of 60-65%, after premixing with a high speed mixer, directly in aliphatic or aromatic liquids. The concentrated paste obtained with the above mentioned method can be suitable for use in printing inks and in paint formulations, including lithographic printing inks.

EXAMPLE 67

This Example is carried out in the same way and with the same types of solvents as described in Example 64, substituting the 810 g of P.R. 48:2 with 810 g Pigment Yellow 81, and substituting 140 g of the dispersant described in Example 64 with 81 g of the dispersant produced according to Example 5, 32 g of alkylpropylene diamine and 56 g of the watersoluble azo dyestuff described in Example 33. The pigment thus obtained can be milled on a 3 roller mill or through a pearl mill (200 kg/h) at a concentration of 50-55% after premixing with a high speed mixer directly in aliphatic or aromatic liquids.

The concentrated paste thus obtained can be suitable for use in printing inks, including lithographic printing inks.

EXAMPLE 68

Into a 10 liters Attritor of Union Process Co. of modified version, provided with a vacuum device applied on the top and cooling/heating jacket connected with a closed heat/cooling system, are introduced 810 g of P.R. 48:2 (C.I. No. 15865), 140 g of the product prepared according to Example 7, 8000 g of steel balls (diameter 1.7 cm) and 1600 g benzene, after which the attritor is closed and stirred for 6 hours at 400 r.p.m. at 50°-60° C. max. The Attritor is stirred for 16 hours at 50°-60° C. under vacuum (5 mm Hg residual pressure) at 50 r.p.m. The product is then cooled to 30° C. under stirring for 1 hour and sieved from the balls. It is obtained a powder consisting of granules measuring 150 -¼ mm.

The pigment is milled at 50-60% concentration after premixing directly in mineral oil PKWF 210/230 or toluene, on a 3 roller mill or through a pearl mill (200 kg.p.h.).

The product thus obtained is suitable for use in printing inks, including lithographic printing inks.

I claim:

1. A modified dispersing agent for preparing an easily dispersable phthalocyanine pigment comprising 12-16 parts by weight of a dispersing agent in an organic liquid, 5-10 parts by weight of a monosulphonated copper phthalocyanine blue and 2-6 parts by weight of a diamine $NHR_3—T—NH_2$, said dispersing agent comprising:

a. a polyesteramide of the formula

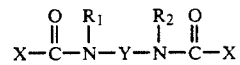

wherein

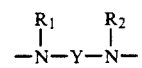

is the residue of a polyester chain having a molecular weight of at least 1700, derived from an aliphatic hydroxycarboxylic acid containing 16-22 carbon atoms;

wherein

is the residue of an amide which is amino terminated on both ends, selected from the group consisting of monoamides and polyamides of the formula

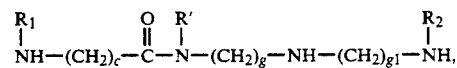

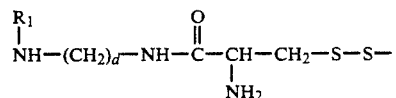

-continued

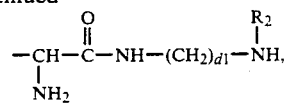

and

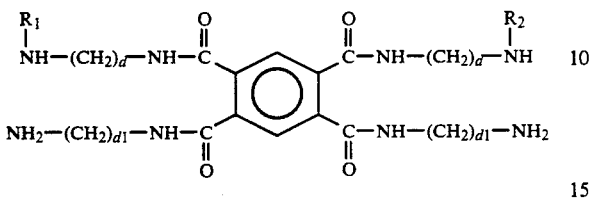

wherein $R_1$, $R_2$, and $R'$ are individually and independently selected from the group consisting of hydrogen, alkyl and alkenyl containing up to 20 carbon atoms, c is from 4 to 12, d and d1 are individually and independently from 2 to 12, g and g1 are individually and independently from 1 to 4, and b. a salt of a carboxylic acid and a diamine, said carboxylic acid containing 8–18 carbon atoms, and said diamine having the formula:

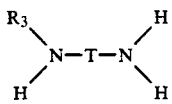

wherein T is selected from the group consisting of alkylene, alkenylene, oxygen-bridged alkylene, oxygen-bridged alkenylene, nitrogen-bridged alkylene and nitrogen-bridged alkenylene containing 2–12 carbon atoms, and $R_3$ is selected from the group consisting of hydrogen, alkyl, and alkenyl containing up to 20 carbon atoms, said salt existing in equilibrium with said carboxylic acid and said diamine, and said polyesteramide being a major part of said composition, and said salt (b) comprising between about 0.2 and about 12% of the total molecular weight of the dispersing agent.

2. The modified dispersing agent of claim 1, wherein the weight of the polyesteramide is from 84.1 to 98.2% of the total weight of the dispersing agent.

3. The modified dispersing agent of claim 1, wherein the polyester chain is derived from a member selected from the group consisting of (a) aliphatic hydroxycarboxylic acids containing 18 carbon atoms and (b) mixtures of said acids and the corresponding carboxylic acids which do not contain a hydroxy group.

4. The modified dispersing agent of claim 3, wherein the polyester chain has the formula

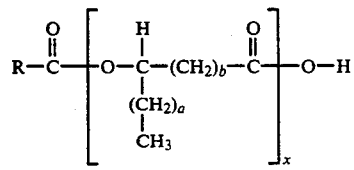

wherein R is an aliphatic $C_{17}$ radical, a is 4–7, b is 8–11 and x is from 8–68.

5. A modified dispersing agent for preparing an easily dispersing diazopigment, comprising:

10–16 parts by weight of a dispersing agent in an organic liquid, said dispersing agent comprising:
a. a polyesteramide of the formula

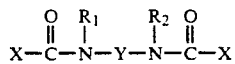

wherein

is the residue of a polyester chain having a molecular weight of at least 1700, dervived from an aliphatic hydroxycarboxylic acid containing 16–22 carbon atoms;
wherein

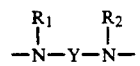

is the residue of an amide which is amino terminated on both ends, selected from the group consisting of monoamides and polyamides of the formula

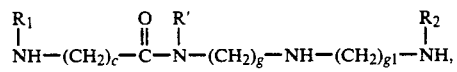

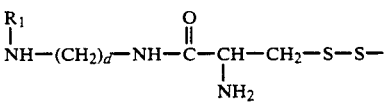

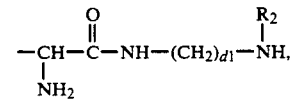

and

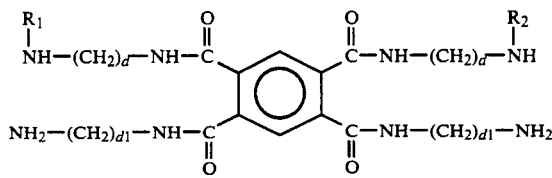

wherein $R_1$, $R_2$, and $R'$ are individually and independently selected from the group consisting of hydrogen, alkyl and alkenyl containing up to 20 carbon atoms, c is from 4 to 12, s and d1 are individually from 2 to 12, q and g1 are individually and independently from 1 to 4, and b. a salt of a carboxylic acid and a diamine, said carboxylic acid containing 8–18 carbon atoms, and said diamine having the formula:

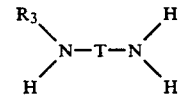

said salt existing in equilibrium with said carboxylic acid and said diamine and said polyesteramide being a major part of said composition, said salt comprising between about 0.2 and about 12% of the total molecular weight of the dispersing agent; 5-10 parts by weight of a disulphonated diazodyestuff; and, 2-7 parts by weight of a diamine having the formula $NMR_3-T-NH_2$;

wherein T is selected from the group consisting of alkylene, alkenylene, oxygen-bridged alkylene, oxygen-bridges alkenylene, nitrogen-bridged alkylene and nitrogen-bridged alkenylene containing 2-12 carbon atoms, and $R_3$ is selected from the group consisting of hydrogen, alkyl, and alkenyl containing up to 20 carbon atoms.

6. The modified dispersing agent of claim 5, wherein the weight of the polyesteramide is from 84.1 to 98.2 % of the total weight of the dispersing agent.

7. The modified dispersing agent of claim 5, wherein the polyester chain is derived from a member selected from the group consisting of (a) aliphatic hyroxycarboxylic acids containing 18 carbons atoms and (b) mixtures of said acids and the corresponding carboxylic acids which do not contain a hydroxy group.

8. The modified dispersing agent of claim 7, wherein the polyester chain has the formula

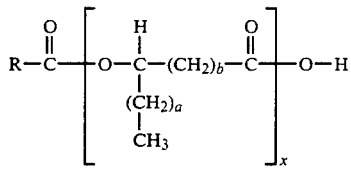

wherein R is an aliphatic $C_{17}$ radical, a is 4-7, b is 8-11 and x is from 8-68.

* * * * *

UNITED STATES PATENT AND TRADEMARK OFFICE
CERTIFICATE OF CORRECTION

PATENT NO. : 5,153,069
DATED : October 6, 1992
INVENTOR(S) : Giuseppe Canestri

It is certified that error appears in the above-identified patent and that said Letters Patent is hereby corrected as shown below:

In columns 5 and 6, formula XII should appear as follows:

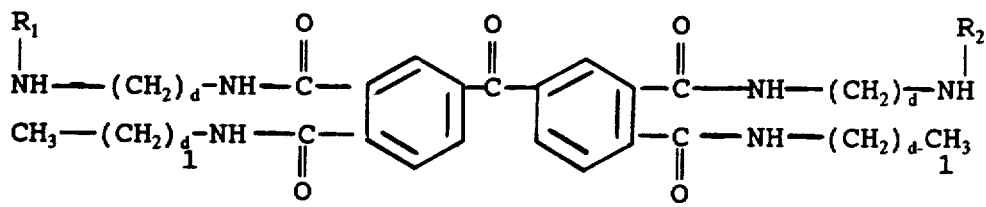

In column 8, line 36, "disperable" should read --dispersable--.

In column 21, line 45, "Until" should read --until--.

In column 24, line 20, delete "flushed being", second occurrence.

In column 28, Example 39, the formula should read as follows: --

UNITED STATES PATENT AND TRADEMARK OFFICE
CERTIFICATE OF CORRECTION

PATENT NO. : 5,153,069
DATED : October 6, 1992
INVENTOR(S) : Giuseppe Canestri

It is certified that error appears in the above-identified patent and that said Letters Patent is hereby corrected as shown below:

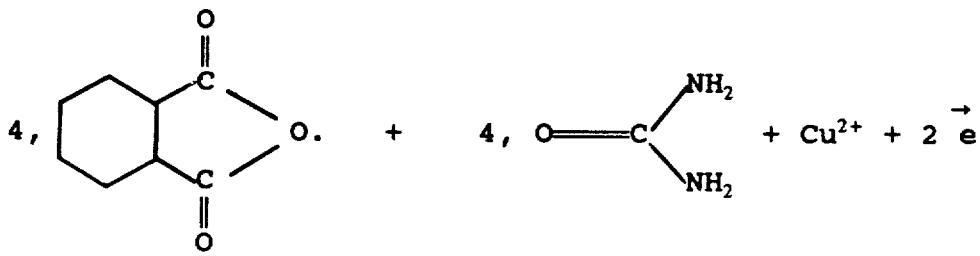

$C_{32}H_{16}N_8Cu + 8H_2O + 4\ CO_2$--.

In column 36, line 18, "150" should read --1/8--.

In column 36, lines 35-59, should read as follows as per Supplemental Preliminary Amendment dated May 15, 1991:

--a. a polyesteramide of the formula

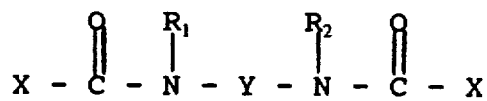

UNITED STATES PATENT AND TRADEMARK OFFICE
CERTIFICATE OF CORRECTION

PATENT NO. : 5,153,069
DATED : October 6, 1992
INVENTOR(S) : Giuseppe Canestri

It is certified that error appears in the above-identified patent and that said Letters Patent is hereby corrected as shown below:

wherein

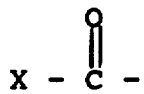

is the residue of a polyester chain having a molecular weight of at least 1700, derived from an aliphatic hydroxycarboxylic acid containing 16-22 carbon atoms;

wherein

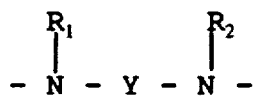

is the residue of an amide which is amino terminated on both ends, selected from the group consisting of monoamides and polyamides of the formula--.

In column 38, line 54, change "s" to read --d--.

In column 38, line 55, change "q" to read --g--.

In column 38, line 55, insert --and independently-- after "individually".

UNITED STATES PATENT AND TRADEMARK OFFICE
CERTIFICATE OF CORRECTION

PATENT NO. : 5,153,069

DATED : October 6, 1992

INVENTOR(S) : Giuseppe Canestri

It is certified that error appears in the above-identified patent and that said Letters Patent is hereby corrected as shown below:

In column 39, line 8, change "bridges" to read --bridged--.

Signed and Sealed this

Twenty-third Day of November, 1993

Attest:

BRUCE LEHMAN

Attesting Officer     Commissioner of Patents and Trademarks